United States Patent [19]

Miyaguchi et al.

[11] Patent Number: 5,093,722

[45] Date of Patent: Mar. 3, 1992

[54] DEFINITION TELEVISION DIGITAL PROCESSING UNITS, SYSTEMS AND METHODS

[75] Inventors: Hiroshi Miyaguchi, Tokyo, Japan; Jimmie D. Childers, Missouri City, Tex.

[73] Assignee: Texas Instruments Incorporated, Dallas, Tex.

[21] Appl. No.: 486,662

[22] Filed: Mar. 1, 1990

[51] Int. Cl.$^5$ .............................................. H04N 7/01
[52] U.S. Cl. .................................. 358/140; 358/160; 358/167; 358/36; 358/136; 358/21 R; 364/749
[58] Field of Search ................ 358/140, 105, 36, 167, 358/160, 21 R, 136; 364/749

[56] References Cited

U.S. PATENT DOCUMENTS

| | | | |
|---|---|---|---|
| 4,562,435 | 12/1875 | McDonough et al. | 340/798 |
| 4,739,474 | 4/1988 | Holsztynski | 364/200 |
| 4,745,458 | 5/1988 | Hirano | 358/140 |
| 4,800,425 | 1/1989 | Schwerzel | 358/136 |
| 4,817,175 | 3/1989 | Tenenbaum et al. | 382/41 |
| 4,882,625 | 11/1989 | Akiyama | 358/140 |
| 4,897,720 | 1/1990 | Wu | 358/136 |
| 4,939,575 | 7/1990 | Childers | 358/21 R |

OTHER PUBLICATIONS

S. Naimpally, et al., "Integrated Digital IDTV Receiver with Features", *IEEE Transactions on Consumer Electronics*, vol. 34, No. 3, Aug., 1988.
K. Sunada, et al., "High Picture Quality TV Receiver with IDTV System", *IEEE Transactions on Consumer Electronics*, vol. 34, No. 4, Nov., 1988.
Fisher, Allen L. et al., Real-Time Image Processing on Scan Line Array Processors, IEEE, 1985, pp. 486–488.
Fountain, T. J., text book, Integrated Technology for Parallel Image Processing, "Plans for the CLIP7 Chip.", Chapter 13, pp. 209–211.

*Primary Examiner*—Howard W. Britton
*Assistant Examiner*—Sherrie Hsia
*Attorney, Agent, or Firm*—William DeMond; Melvin Sharp; James F. Hollander

[57] ABSTRACT

A television receiving system includes a digital unit, which has at least one single-instruction multiple-data processor, especially suited for television processing. The processor receives data samples of each horizontal line word-serially, but processes the line in parallel. The processor has input, computational, and output layers that operate concurrently. Internal register files emulate line memory to eliminate the need for external line memories. The processor may be programmed with various improved definition television tasks, downloaded to it from a host development system.

29 Claims, 34 Drawing Sheets

INACTIVE LINE (vertical blanking area)

RSTW(fm) _____

WE(fm) _____

RSTW(svp) _____

WE(svp) _____

RSTW(fmc) _____

WE(fmc) _____

RSTR(fm) _____

RE(fm) _____

RSTR(svp1) _____

RE(svp1) _____

RSTR(svp2) _____

RE(svp2) _____

Figure 19A

BEFORE FIRST ACTIVE LINE (vertical blanking area)

RSTW(fm) ___|_____

WE(fm) _____

RSTW(svp) _____

WE(svp) _____

RSTW(fmc) ___|_____

WE(fmc) _____

RSTR(fm) ___|_____

RE(fm) _____

RSTR(svp1) _____

RE(svp1) _____

RSTR(svp2) _____

RE(svp2) _____

Figure 19B

INACTIVE LINE (vertical blanking area)

RSTW(fm) _____

WE(fm) _____

RSTW(svp) _____

WE(svp) _____

RSTW(fmc) _____

WE(fmc) _____

RSTR(fm) _____

RE(fm) _____

RSTR(svp1,2) _____

RE(svp1,2) _____

RSTR(svp3) _____

RE(svp3) _____

Figure 22A

BEFORE FIRST ACTIVE LINE (vertical blanking area)

RSTW(fm) ⎯⎯|⎯⎯⎯⎯⎯⎯⎯⎯⎯⎯⎯⎯⎯⎯⎯⎯⎯⎯⎯⎯⎯⎯

WE(fm) ⎯⎯⎯⎯⎯⎯⎯⎯⎯⎯⎯⎯⎯⎯⎯⎯⎯⎯⎯⎯⎯⎯⎯⎯

RSTW(svp) ⎯⎯⎯⎯⎯⎯⎯⎯⎯⎯⎯⎯⎯⎯⎯⎯⎯⎯⎯⎯⎯⎯⎯⎯

WE(svp) ⎯⎯⎯⎯⎯⎯⎯⎯⎯⎯⎯⎯⎯⎯⎯⎯⎯⎯⎯⎯⎯⎯⎯⎯

RSTW(fmc) ⎯⎯|⎯⎯⎯⎯⎯⎯⎯⎯⎯⎯⎯⎯⎯⎯⎯⎯⎯⎯⎯⎯⎯⎯

WE(fmc) ⎯⎯⎯⎯⎯⎯⎯⎯⎯⎯⎯⎯⎯⎯⎯⎯⎯⎯⎯⎯⎯⎯⎯⎯

RSTR(fm) ⎯⎯|⎯⎯⎯⎯⎯⎯⎯⎯⎯⎯⎯⎯⎯⎯⎯⎯⎯⎯⎯⎯⎯⎯

RE(fm) ⎯⎯⎯⎯⎯⎯⎯⎯⎯⎯⎯⎯⎯⎯⎯⎯⎯⎯⎯⎯⎯⎯⎯⎯

RSTR(svp1,2) ⎯⎯⎯⎯⎯⎯⎯⎯⎯⎯⎯⎯⎯⎯⎯⎯⎯⎯⎯⎯⎯⎯⎯⎯

RE(svp1,2) ⎯⎯⎯⎯⎯⎯⎯⎯⎯⎯⎯⎯⎯⎯⎯⎯⎯⎯⎯⎯⎯⎯⎯⎯

RSTR(svp3) ⎯⎯⎯⎯⎯⎯⎯⎯⎯⎯⎯⎯⎯⎯⎯⎯⎯⎯⎯⎯⎯⎯⎯⎯

RE(svp3) ⎯⎯⎯⎯⎯⎯⎯⎯⎯⎯⎯⎯⎯⎯⎯⎯⎯⎯⎯⎯⎯⎯⎯⎯

Figure 22B

DEFINITION TELEVISION DIGITAL PROCESSING UNITS, SYSTEMS AND METHODS

TECHNICAL FIELD OF THE INVENTION

This invention generally relates to television receiving systems, and more particularly to a receiving system that uses a single-instruction multiple-data processor to produce an improved definition picture from a standard television signal.

BACKGROUND OF THE INVENTION

The television system in use in the United States today is based on the National Television Systems Committee (NTSC) standard. This standard was adopted in 1953 and has remained unchanged since then. Although the standard is used in many foreign countries, it has limitations that newer standards seek to avoid. Thus, additional standards, such as Phase Alternate Line (PAL), Sequential Color and Memory (SECAM), and Multiplexed Analog Component (MAC) have been developed and used outside the United States.

At the receiving end of the television system, one major limitation of the NTSC standard signal is crosstalk between demodulator output signals, which causes color distortion. In addition the NTSC system is sensitive to transmission path differences that introduce phase errors, which cause color errors. It is this latter limitation of NTSC systems that the PAL standard seeks to improve. PAL signals reverse the phase of the color information on adjacent horizontal lines so that phase errors may be averaged out by the viewer's eyes.

Both the NTSC and the PAL systems use composite television signals, containing a luminance signal and two chrominance signals modulated on a color subcarrier. The color subcarrier is both amplitude and phase modulated by the color signals. Another type of composite system is the SECAM system, in which color transmission is in a line sequential form, with only one of two color difference signals transmitted at one time. First, one color difference signal is transmitted on one line, then the other color difference signal is transmitted on the following line. Two frequency modulated subcarriers are used to represent the color difference signals. As compared to composite systems, the MAC system is a component system, which time-multiplexes chrominance and luminance signals.

A recent advance in consumer electronics is in the area of improved television pictures using these standard signal transmissions. Because existing transmission standards are deeply entrenched and difficult to change, one approach would be to re-design television receivers to improve the display produced by standard signal transmissions. This approach is referred to as improved definition television (IDTV).

IDTV systems would have many advantages over analog systems. The picture improvements would include non-interlacing, filtering, and noise reduction. From the viewer's standpoint the effect should be reduction of artifacts such as line crawl, line structure visibility, line flicker, large area flicker, and picture interference. IDTV systems should also reduce cross luminance and cross chrominance and clean noise from weak signals.

A need exists for a digital processor system for producing IDTV pictures, which operates in real time and minimizes overhead from memory/processor input and output. Ideally, the system should be software programmable so that processing functions can be developed and tested before the system is permanently programmed.

The use of digital processors and field memory devices enables special picture features, which are not available with analog television receivers. These special features would include multiple screen displays and still pictures. Thus, a need also exists for a digital television receiver system that provides special features of this nature.

SUMMARY OF THE INVENTION

One aspect of the invention is a digital processing system for producing improved pictures from data samples of a standard television transmission signal. A serial video processor, which processes the data samples, has a number of processing elements corresponding to the number of data samples per horizontal line of the incoming signal. The processor receives data for one line word-serially, and its arithmetic units operate on the data for one line in parallel. The processor has input and output registers and arithmetic units, which permit it to receive, process, and output data simultaneously. A control unit provides control, address, and timing signals to the processor; and a memory stores instructions used by the processor.

A technical advantage of the invention is that the processor system is software programmable to facilitate system development, yet provides real-time processing. Video processes and timing signals can be developed and tested on a host computer and then downloaded to the processor system. This general purpose processor approach eliminates the need for custom devices and permits the same processor to be used for a variety of tasks.

BRIEF DESCRIPTION OF THE DRAWINGS

FIGS. 19A–19C are timing diagrams for the processing system of FIG. 18.

FIGS. 22A–22C are timing diagrams for the processing system of FIG. 21.

DETAILED DESCRIPTION OF THE INVENTION

Related Applications

This application is related to U.S. patent application Ser. Nos. 119,890, filed Nov. 13, 1987, 435,862, 119,889, filed Nov. 13, 1987, 256,150, 323,045, and 402,975. These applications have a corresponding European Patent Application No. 0 317 218, filed Nov. 11, 1988.

This application is also related to U.S. Ser. No. 421,499, which was filed in the United States on Oct. 13, 1989. These applications are assigned to Applicant's assignee and the contents of these applications are hereby incorporated herein by reference.

Serial Video Processor

Figure 1:
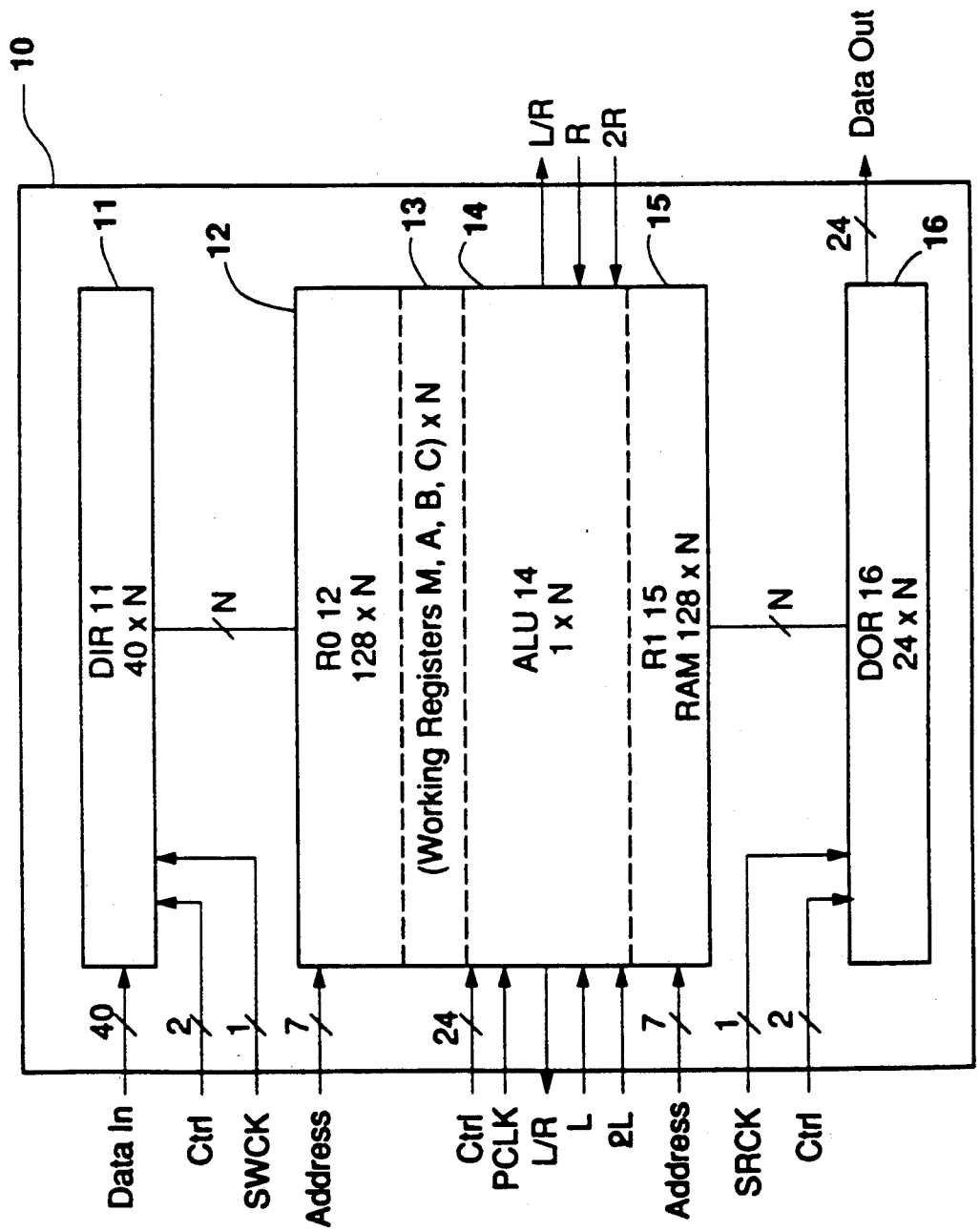
FIG. 1 is a block diagram of a serial video processor.

FIG. 1 illustrates an example of a serial video processor (SVP) 10, which may also be described as a synchronous vector processor (also SVP). The SVP 10 of FIG. 1 is the subject of the copending patent applications cited above, with various uses for SVP 10 being the subject of subsequent sections of this patent application. However, the various embodiments discussed herein are not necessarily limited to use with this particular SVP 10, and variations of SVP 10 may be used.

The "serial video" aspects of SVP 10 derive from the fact that it is particularly suited for video processing, where discrete packets of incoming data, which have a uniform size, are input and output in a word-serial manner but are processed in parallel. The "synchronous vector" aspects of SVP 10 derive from the fact that it receives and processes data vectors in synchronization with a real time data source. Essentially, SVP 10 operates by using fine-grained parallelism techniques in which many processing elements operate on the data concurrently.

SVP 10 is a general purpose, mask-programmable, single instruction multiple data (SIMD), reduced instruction set computing (RISC) device. Consistent with the SIMD characteristic, SVP 10 has a number of processing elements (PE's), which execute the same instruction at the same time. External microinstructions control primitive logic and arithmetic functions for each clock cycle.

Figure 2:
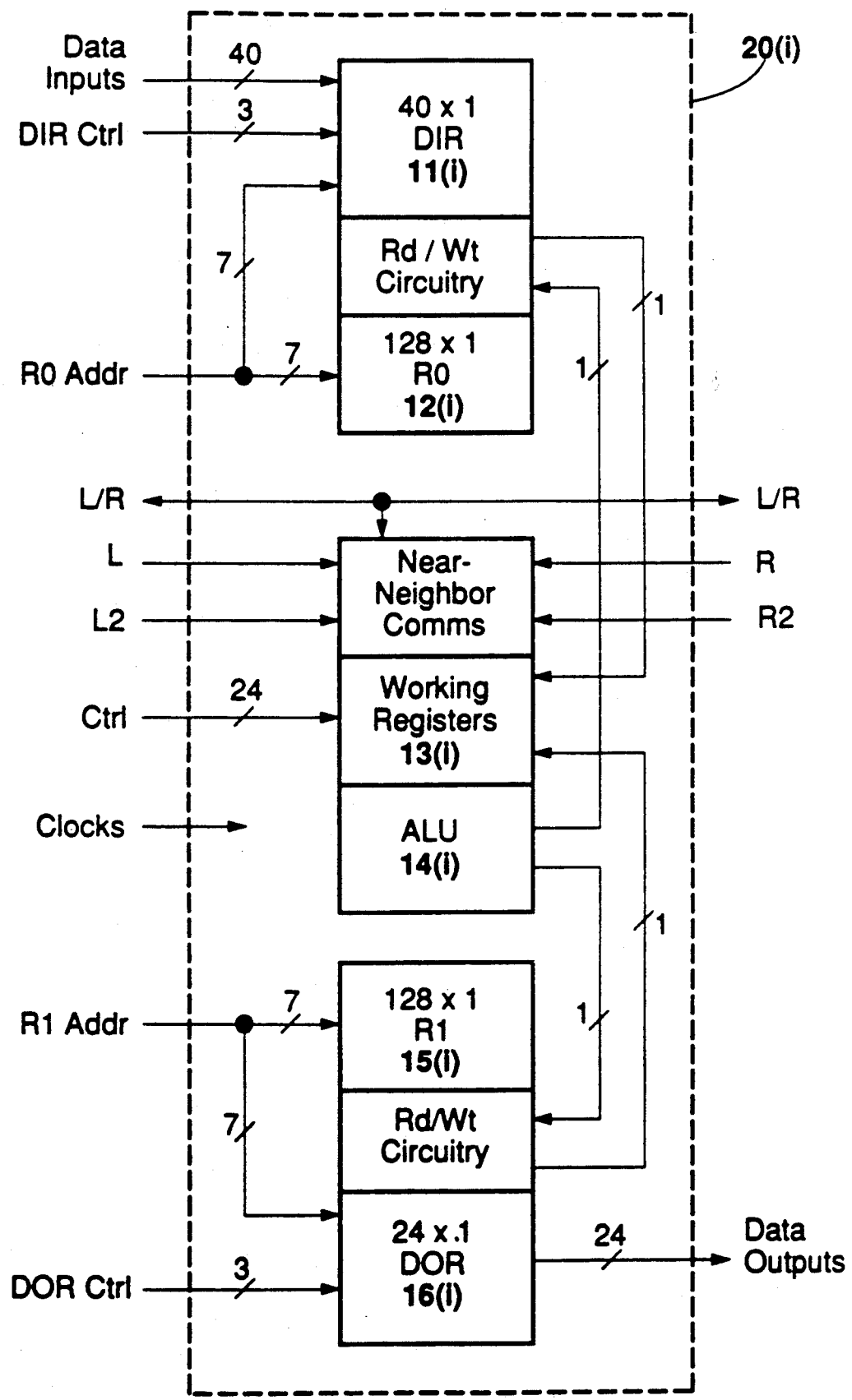
FIG. 2 is a block diagram of a single processing element of the processor of FIG. 1.

Referring to FIGS. 1 and 2, SVP 10 is a one-dimensional array of one-bit PE's 20. Each PE 20 has the following basic components: a data input register (DIR) 11, two independently addressed register files (R0 and R1) 12 and 15, a set of working registers (WR's) 13, a one bit arithmetic unit (ALU) 14, and a data output register (DOR) 16. These are described briefly in this section, and reference to the related patents cited above will provide further description, especially with regard to instructions and timing.

DIR 11 can be thought of as the "input layer". R0 12 and R1 15, the WR's 13, and the ALU 14 are the "computational layer". DOR 16 is the "output layer". Although each layer may be independently clocked across each layer, all PE's 20 operate in unison, every clock cycle. The input to DIR 11 is word-serial in the sense that words of an incoming packet of data are received into DIR 11 word by word. Similarly, the output from DOR 16 is word-serial.

Although input and output are word-serial, processing of each data packet is parallel. Also, because of the "layered" approach to processing, data input, computation, and data output may be concurrent operations, with each being independently clocked. Each PE 20 performs these operations on an entire vector of data at once, and is thus a "pipeline" that enables several operations to be in various stages at once. When a vector instruction is executed, the elements of the vector are fed into the appropriate pipeline one at a time, delayed by the time it takes to complete one stage of the pipeline. Input and output are in synchronization with the data source, such as a video camera, and with the data sink, such as a raster scan display.

For purposes of illustration, SVP 10 has N number of PE's 20, where N=1024. The memory size is 256 bits for each PE 20, with 128 bits each for R0 and R1, DIR 11 is 40 bits wide and DOR 16 is 24 bits wide. These sizes are discretionary, however, and may be changed without changing the substance of the invention. Other input and output bit sizes are included in FIGS. 1 and 2 to illustrate various input/output and device size relationships. However, these bit sizes may be easily varied.

Using these values, a single SVP 10 can process data packets of 1 to 1024 words by 40 bits. Typically, the packets are equal in size and represent periodically recurring data, such as lines of a television image, where each packet is digitized into N number of data samples, and where each sample, S(i), i=1 ... N, is a data word used to generate an output word. In television applications, where SVP 10 has N PE's 20, N also represents the number of data samples per line.

FIG. 2 illustrates a single PE 20(i) and its associated components, where i=1 ... 1024. A vertical slice through SVP 10 of FIG. 1 yields an individual PE 20 of FIG. 2, thus each PE 20(i) and its components are referred to herein as a "column" with respect to the entire array of SVP 10.

DIR 11 and DOR 16 are the basic I/O devices of SVP 10. Both DIR 11 and DOR 16 are arrays of sequentially addressed, dual-ported memory cells. As used in this description, "DIR 11" refers to the entire array, and "DIR 11(i)" refers to the column of DIR 11 that receives data sample S(i).

Referring to both FIGS. 1 and 2, the input array size to SVP 10 permitted by DIR 11 is 1024 words×40 bits. One port of DIR 11 is organized as 1024 words of 40 bits each and permits DIR 11 to be written into from a 40 bit input line in parallel. Thus, this first port of DIR 11 emulates the write port of a 1024-word line memory, which permits word-serial input. The second port of DIR 11 is organized as 40 words of 1024 bits each, where each bit corresponds to a PE 20(i). This second port provides an interface between DIR 11 and PE's 20. It is physically a part of, and is mapped into, the absolute address space of R0 12. This permits the contents of DIR 11 to be addressed for selection to write into memory and is read in parallel.

Like DIR 11, DOR 16 is a two port device. In a manner similar to DIR 11, it provides 1-bit access to each ALU 14(i) and 24-bit output from SVP 10. One port of DOR 16 is organized as 1024 words of 24 bits each. This port functionally emulates the read port of a 1024-word line memory and is used for word-serial output. The second port of DOR 16 is organized as 24 words of 1024 bits each, where each bit corresponds to a PE(i). This second port couples to R1 15, and is written to in parallel.

The write and read control signals to DIR 11 and from DOR 16 are explained in detail in subsequent sections of this application, but in general, DIR 11 and DOR 16 each have a 1024-bit word selection commutator, which controls loading to and reading from DIR 11 and DOR 16, respectively. Also, DIR 11 and DOR 16 each have an enable and a reset signal.

The data inputs to DIR 11 are controlled by the signals Write Enable (WE), Reset Write (RSTWH), and Serial Write Clock (SWCK). WE controls both the write function and the address pointer increment function synchronously with SWCK, which is the data sample clock input. When high, RSTWH resets the address pointer to the first word in the data input buffer on the next rising edge of SWCK. After an initial three-clock delay, one 40-bit word of data is written on each subsequent rising edge of SWCK. If data words 1 through M are to be written, WE remains high for M rising edges of SWCK, where 1≤M≤N and N is the number of PE's 20. The control signals for DOR 16 are Read Enable (RE), Reset Read (RSTRH), and Serial Read Clock (SRCK), which operate in a manner analogous to the DIR signals.

R0 12 and R1 15 each have 128 words by 1 bit of read/write memory per PE 20. Different addressing structures cover the R0 12 and R1 15. However, R0 12 and R1 15 share the same control and timing circuitry. R0 12 and R1 15 are comprised of random access memory (RAM) cells. If dynamic RAM cells are used, they must be refreshed, but typical digital television applications perform the refresh by operating in a faster refresh time than the required refresh period.

Each R0 12(i) and R1 15(i) is independently addressable, and is capable of 1-bit read-modify-write cycle such that it can be read, the data operated on by ALU 14, and the result written back to it in a single clock cycle. R0 12 and R1 15 read data at the same time, but write separately.

The working register (WR) set 13(i) for each PE 20(i) comprises four registers: M, A, B, and C. These registers are the same, except for their data sources and destinations. Each WR 13(i) is associated with an input multiplexer for providing data to the four inputs of each ALU 14(i). The M register is used for division, multiplication, and logical and conditional operations. Registers A, B, and C are addend, minuend, and carry/borrow registers, respectively.

ALU 14 is a simple full adder/subtracter and a one-bit multiplier. The inputs to ALU 14 are from the WR's 13. These ALUs carry out whatever instruction is specified by the control unit of SVP 10. A feature of SVP 10 is that each ALU 14 executes instructions from a set of instructions that operate on data directly. A control unit, which feeds an instruction stream to SVP 10 has an additional set of instructions that provide basic execution control. The control unit is further described below in connection with FIG. 5A.

Figure 3:
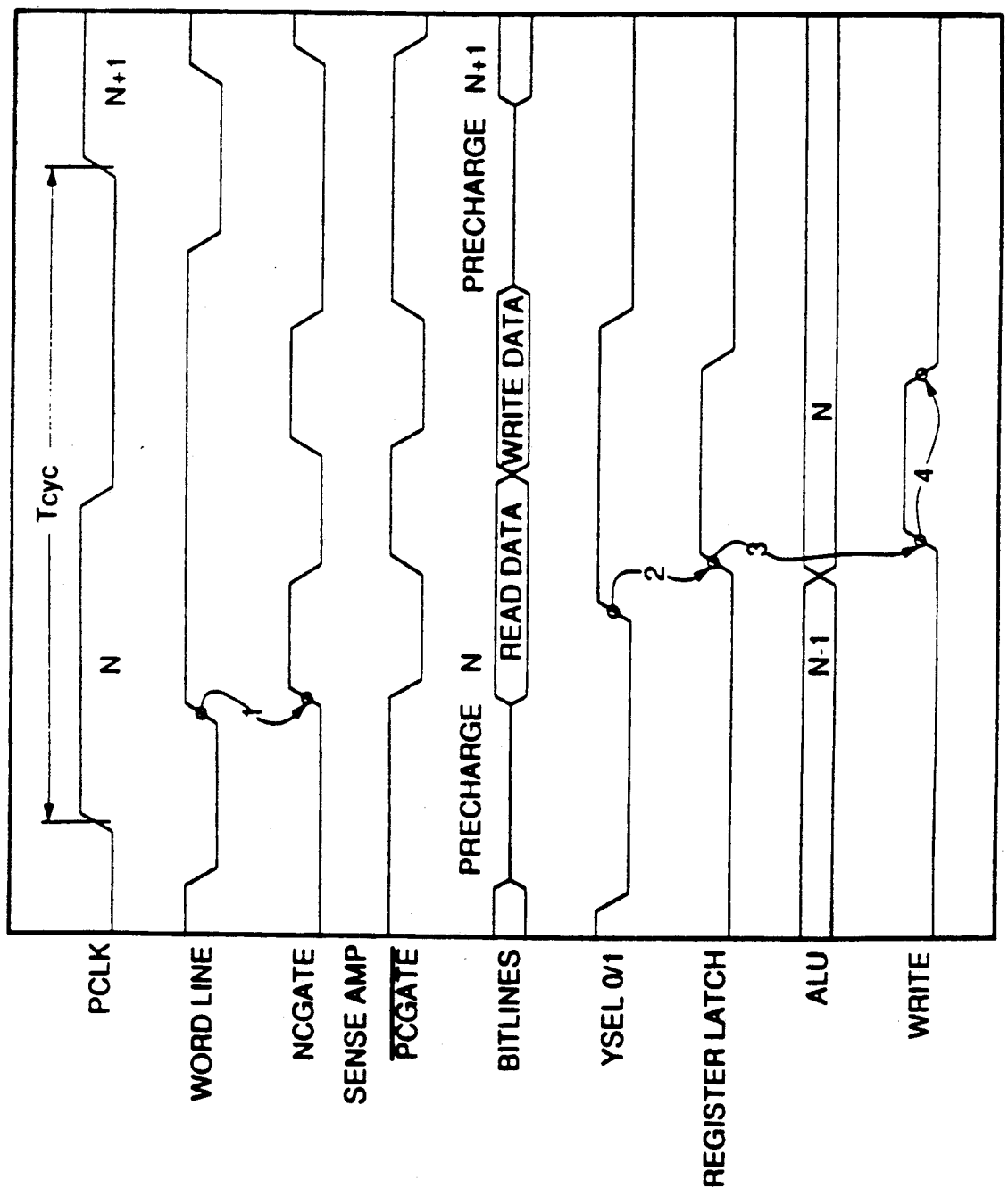
FIG. 3 is a timing diagram of one horizontal line cycle of the processor of FIG. 1.

FIG. 3 is a timing diagram of a single cycle of SVP 10. A processing clock (PCLK) is one of three clocks of SVP 10, where each clock corresponds to an input, computational, or output layer. Although the clocks are asynchronous to permit concurrent operations of these three layers, the input and output clocks stop to permit data transfers into and out of the computational layer.

In FIG. 3, one PCLK cycle, N, has a period, T. The labeled timing points indicate interlocked edges, where NCGATE and PCGATE are control signals for sense amplifiers (not shown) and YSEL 0/1 indicates a signal for selecting odd or even addresses of R0 12 or R0 15. The sense amplifiers amplify and control the BITLINES for R0 12 and R1 15 transfers. To achieve single-cycle, 1024-bit, parallel computations, data transfers between R0 12, R1 15, and ALU 14 are precisely timed. Each such data transfer is held off by a computation interlock circuit until the end of computation is indicated. This technique yields a fast memory/processor data transfer rate.

Figure 4:
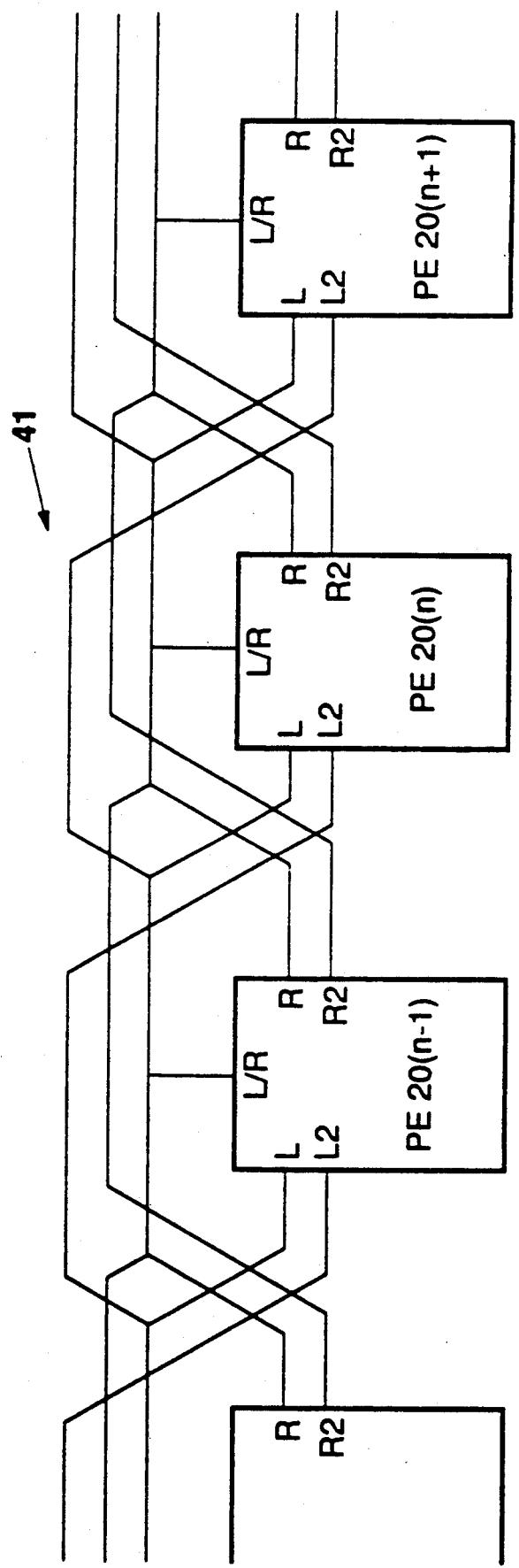
FIG. 4 illustrates near neighbor communications between the processing elements of the processor of FIG. 1.

FIG. 4 illustrates the near neighbor communications among PE's 20. A left/right (L/R) bus 41 provides direct memory and register read/write from each PE 20 to its four nearest neighbor PE's 20, i.e., the two PE's 20 to the left and the two PE's 20 to the right. To accomplish such communication, each PE 20 generates one output, which is fanned out to its four neighbor PE's 20. This output may be from any one of four sources: a logical 0, the contents of the B register of WR 13, or a location from either R0 12 or R1 15. Each PE 20 also receives four signals, one from each of its four nearest neighbors.

As will be explained below, many IDTV processing tasks involve the use of filter algorithms to remove unwanted signal artifacts. The L/R communication bus 41 of FIG. 4 is especially useful for multi-tap FIR filters, which can be factored into five or fewer taps.

SVP Video Applications

As indicated above, SVP 10 is especially useful for video processing. Each horizontal line of a television signal is digitized as a data "packet" comprised of a word-sample representing each pixel. SVP 10 loads, processes, and outputs data for each pixel on a horizontal line in parallel. The architecture of SVP 10 permits data vectors from multiple pixels, multiple lines, or multiple fields to be processed in parallel, and hence SVP 10 is capable of the "three dimensional processing" required for digital television.

A particular advantage of using SVP's 10 is that its register files R0 12 and R1 15 eliminate the need for discrete line memories. Line-by-line storage is emulated in the processing of SVP 10, using a software procedure, referred to as "global rotation". This procedure is explained in detail in the above-cited U.S. patent application Ser. No. 421,499.

Figure 5A:
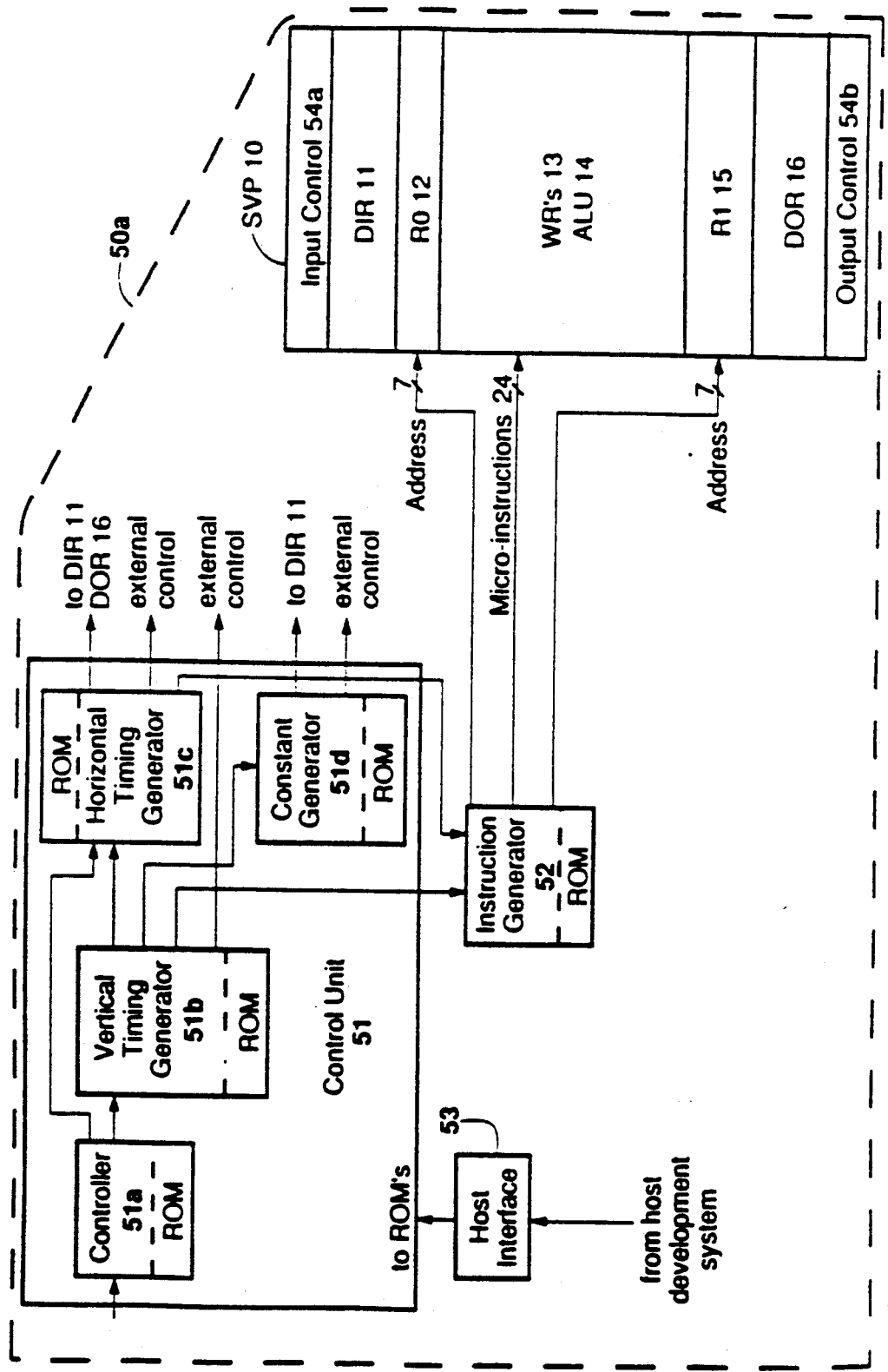
FIG. 5A is a block diagram of a processor system, which uses at least one serial video processor.

This application is directed to various configurations and uses of SVP 10 in a digital processing system for improved definition television. FIG. 5A illustrates a basic processor system 50a having a single SVP 10. FIG. 5A illustrates the control, address, and instruction inputs to SVP 10, and may be supplemented with the description of the same circuits in the above-cited U.S. patent application Ser. No. 421,499. The television receiver circuitry surrounding processor system 50a is described in connection with FIG. 5B, which also illustrates data inputs to SVP 10. Referring now to FIG. 5A, the basic components of processor system 50a are SVP 10, an SVP control unit 51, and an instruction generator 52. The use of one SVP 10 versus more than one SVP 10 is dependent on the complexity of the processing tasks and hence on the execution time. For full-screen real-time video processing, the operations performed on a line of picture data must be executed in a single 1H period, where H represents the period of one horizontal scan line. However, if 1H is not enough time, more than one SVP 10 may be interconnected and the processing tasks partitioned among them. In this case, each SVP 10 uses its own instruction generator 52 to compute different algorithms, but may share control unit 51.

Each SVP 10 need not have the exact configuration of FIGS. 1 and 2. As already stated, the distinguishing characteristics of an SVP 10 is the ability to process a data packet representing a data packet consisting of an entire line of a television picture in parallel, using a processing element for each pixel.

SVP control unit 51 has several components: controller 51a, vertical timing generator 51b, horizontal timing generator 51c, and constant generator 51d. Ideally, each of these devices is programmable and accesses its own program store memory. In FIG. 5A, each of these components has its own read only memory (ROM). To facilitate development of processing tasks, ROMs may be replaced with RAM, programs may be developed on a host system (not shown) and downloaded to each RAM, using standard interface techniques. A host interface 53 may be for either parallel or serial data transfers, for example an RS-232C interface.

In operation, SVP control unit 51 generates control signals for SVP 10, which are synchronized with the vertical synchronization signal and the horizontal synchronization signal of the incoming television transmission. These control signals include operating constants, instructions, and timing signals. As an overview of the timing operation of SVP control unit 51, controller 51a controls the video signal processing at a field or frame rate, vertical timing generator 51b controls processing at a line rate, and horizontal timing generator 51c controls processing at a pixel rate.

SVP control unit 51 also provides timing and control signals to other system components, such as for horizontal and vertical synchronization. These latter timing signals are "external" in the sense that they do not control processor system 50a. Instead they control devices such as field memories, as described in subsequent sections of this application.

Figure 5B:
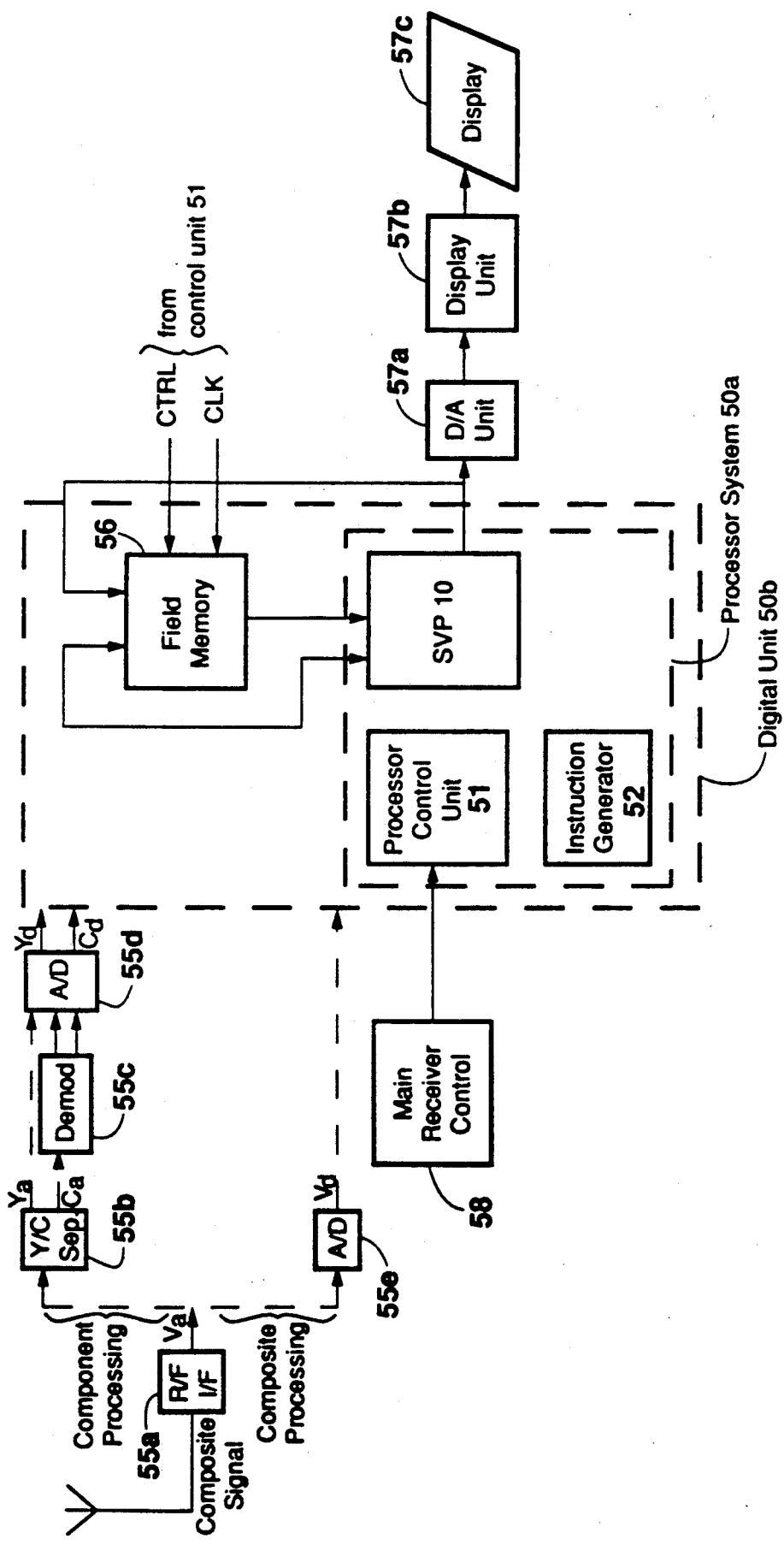
FIG. 5B is a block diagram of a television receiver system, which includes the processor system of FIG. 5A as part of a digital unit.

Controller 51a receives and interprets external commands from a main television receiver control unit (shown in FIG. 5B). It generates a series of control codes to vertical timing generator 51b and horizontal timing generator 51c. Controller 51a is programmable with a variety of instructions, including conditional and vectored jumps.

Vertical timing generator 51b provides control codes to horizontal timing generator 51c, constant generator 51d, and instruction generator 52. It provides timing to external circuits requiring a timing resolution of one horizontal line.

Horizontal timing generator 51c generates timing signals for circuits requiring timing edges at sample clock rates, such as DIR 11, DOR 16, field memories, and A/D and D/A converters (shown in FIG. 5B). It is capable of producing timing edges with a resolution as small as one sample clock.

Similarly, constant generator 51d provides constant values to individual PE's 20. There are two main reasons for using such constants. First, it is possible to map waveforms onto the PE's 20. Second, local constants distinguish the I chrominance signal from the Q signal, and permit the PE's 20 to multiplex and demultiplex the chrominance signal and to modify algorithms in the horizontal direction when merging two images.

Instruction generator 52 receives algorithm specifier codes from vertical timing generator 51b and condition flags from horizontal timing generator 51c. Instruction generator 52 is associated with program storage, such as a ROM. In development stage, the ROM may be replaced with RAM, to which instructions may be downloaded from a host system (not shown). This program store outputs microinstructions to ALU 14 and addresses for R0 12 and R1 15. The program store also provides basic execution control instructions for instruction generator 52, such as for jumps, calls and returns, test flags, and global rotation.

The various IDTV processing functions performed by processor system 50a may include non-interlacing, motion detection, luminance and chrominance signal separation, crosstalk elimination, interpolation and decimation, scan conversion, and contour compensation. Subsequent sections of this patent application describe different embodiments of processor system 50a, but in general, each embodiment performs at least some of these IDTV tasks.

FIG. 5B is a block diagram of the basic components of a television receiving system, which includes processor system 50a. More specifically, processor system 50a is part of a digital unit 50b, which also includes field memory 56.

At the front end of the system, a video signal from an antenna or other source is detected in the usual manner through standard RF/IF unit 55a, producing an analog video signal Va.

As indicated by FIG. 5B, there are two alternate approaches to digital television receiver systems, which are distinguished by the manner in which an incoming signal is separated and digitized at the front end. Specific embodiments of both component and composite receivers are described below in connection with FIGS. 17-31, with this section being primarily intended as a general introduction to their common aspects.

For component processing, luminance and chrominance signal separation is performed by analog separation unit 55b to obtain Ya and Ca. Ca is demodulated by demodulator 55c. An A/D unit 55d converts the signals to Yd and Cd, which are the inputs to digital unit 50b, which performs crosstalk elimination.

For composite processing, the incoming signal Va is converted to a digital signal Vd, using A/D unit 55e. Vd is the input to digital unit 50b, which performs luminance and chrominance separation digitally.

Regardless of whether component or composite processing is being performed the data delivered to digital unit 50b, in digital form, is referred to herein as the "signal" due to the fact that it represents a continuous incoming picture signal. Although word sizes and sampling rates may vary, for purposes of example herein, the sampling frequency is 4 fsc for luminance signals and 1 fsc for two chrominance signals, where fsc is the color subcarrier frequency. The two 1 fsc sampled 8-bit chrominance signals are multiplexed to get one 2-fsc sampled 8-bit signals. Also, the 8-bit signal is multiplexed to get a 4-bit wide 4-fsc sampled signal. Thus, for the component processing route, the inputs to processor system 50a are a 4-fsc-sampled 8-bit luminance signal, Yd, and a 4-fsc-sampled 4-bit chrominance signal, Cd.

The data inputs to digital unit 50b are via DIR 11 and DOR 16 as explained above in connection with FIGS. 1, 2, and 5A. Control inputs are as explained in connection with FIG. 5A.

Digital unit 50b has a processor system 50a and field memory 56. Processor system 50a is in accordance with FIG. 5A and may have more than one SVP 10, each with an associated instruction generator 52. Field memory 56 is simply a standard first in, first out memory for storing fields of video data. Field memory 56 is actually comprised of a number of field memories 56(i), which provide digital unit 50b with field-delayed data used for various processing tasks. Each of these field memories 56(i) may be any one of a number of well known storage devices, such as the TMS4C1060, manufactured by Texas Instruments, Inc. Field memory 56 may be a bank of DRAM's, or because random access is not necessary, may merely provide serial input and output. Depending on the algorithms performed by ALU 14, field memory 56 may be part of a feedback path to SVP 10, or it may simply provide pre-processing or post-processing storage.

Various embodiments of digital unit 50b, specifically adapted for component or composite processing, are described below in connection with FIGS. 17-31. These embodiments vary as to the number and placement of SVP's 10 and field memories 56 for different applications.

A main receiver control unit 58 receives external signals, such as those from a key pad, remote control, or video decoder. It decodes these signals and transmits them to other receiver components, such as SVP control unit 51.

From digital unit 50b, the processed video data signal is output in parallel, as 8-bit words to D/A unit 57a. The resulting signals from D/A unit 57a are the same analog signals that would be received by display unit 57b if processor system 50 were not included. Thus, digital unit 50b is simply interposed in the signal path at the output of a conventional television receiver RF/IF unit 55a.

Display unit 57b converts the processed signals into red, green, and blue signals, using standard matrix techniques.

Display 57c receives the analog video signal from display unit 57b. Typically, display 57c is of a raster scan type, such as a cathode ray tube. However, the invention could be used with any type of display having appropriate adapter circuits to use the signal generated by SVP 10. For example, display 57c could be used with a display memory (not shown) that receives the signal from processor system 50a and outputs all pixel elements in parallel.

IDTV Processing Tasks

As indicated above, the various embodiments of digital unit 50b perform a number of IDTV processes. FIGS. 6-17 illustrate these processes as functional block diagrams. Hardware configurations for performing these tasks are the subject of FIGS. 18-30 and the accompanying descriptions.

In FIGS. 6-17, various notations are used to help explain the three dimensional aspects of television processing. Positional indicators are in terms of a field (f), line (h), or sample(t). Delay indicators are in terms of a current field (V), a current line (H), or a current sample (T). Signal names are indicated as a motion signal (Mxx), a luminance signal (Yxx), or a chrominance signal (Cxx). Some examples are:

M25: signal name
M25(H): no delay in M25 relative to another signal
M25(H−3): M25 is delayed by 3 lines relative to M25(H)
M25(H−525): this is the same as M25(V−2)
M25(H(T−3)): M25 is current line delayed by 3 samples Timing is tied to a reference signal, which is the color burst signal. This signal is transmitted at the beginning of each horizontal line. Its frequency is the color subcarrier frequency, referred to as "fsc". In a NTSC transmission, for example, fsc is about 3.58 MHz, which is 227.5 fh, where fh is the line frequency. The line period, H=1/fh, is about 64 micro-seconds. In the receiver systems described herein, the digital sampling rate is 4 fsc.

A term used herein in connection with various processing tasks is "digital filtering". In general, digital filters may be expressed as z-transform functions, in which the terms represent weighted time delays. The periodicity of television signals impart frequency characteristics to these time delay functions.

To implement a filter process, a filter function is obtained, using the desired filter characteristics. Each data input line represents a filter tap. The notation $z^{-n}$ may represent a delay of n samples, lines, or fields, depending on whether the filter is horizontal, vertical, or temporal, respectively. These delay notations may therefore be equivalently expressed as (T−n), (H−n), or (V−n).

Consistent with the three-dimensional aspects of television processing, i.e., horizontal, vertical, and temporal, digital filtering may also be spatial, which includes horizontal and vertical, or temporal. In the former, the delays are sample delays (T) and line delays (H), respectively. In the latter, the delays are field delays (V). As explained below, the presence or absence of motion in the picture to be displayed may determine the nature of the filter.

The IDTV processing tasks described herein are directed to composite transmission signals, such as those using the NTSC, PAL, and SECAM standards. However, for component transmissions, such as those using MAC, some of the same tasks are applicable. For example, the MAC standard has a 50 Hz field frequency, which is prone to large area flicker. Thus, the methods for increasing field or frame rates, which are discussed below in connection with non-interlacing are applicable to MAC systems.

The various IDTV tasks discussed below include motion detection, luminance and chrominance clean-up processing, non-interlacing, and contour compensation. The description of motion detection is especially detailed, because many of the same concepts and algorithms are applicable to other IDTV tasks.

Motion Detection

FIGS. 6A–6G are block diagrams of the steps of an IDTV motion detection process. As will become evident in subsequent sections of this application, various filtering tasks are affected by motion. In particular, when temporal, i.e., field to field, filtering is desired, filtering of areas in which there is motion would result in blurring. For this reason, it is desirable to change from temporal to spatial, i.e., line-to-line or sample-to-sample, filtering in areas where motion is detected. This change is accomplished by means of a motion detection signal, which is produced by the process of FIGS. 6A and 6B.

Figure 6A:
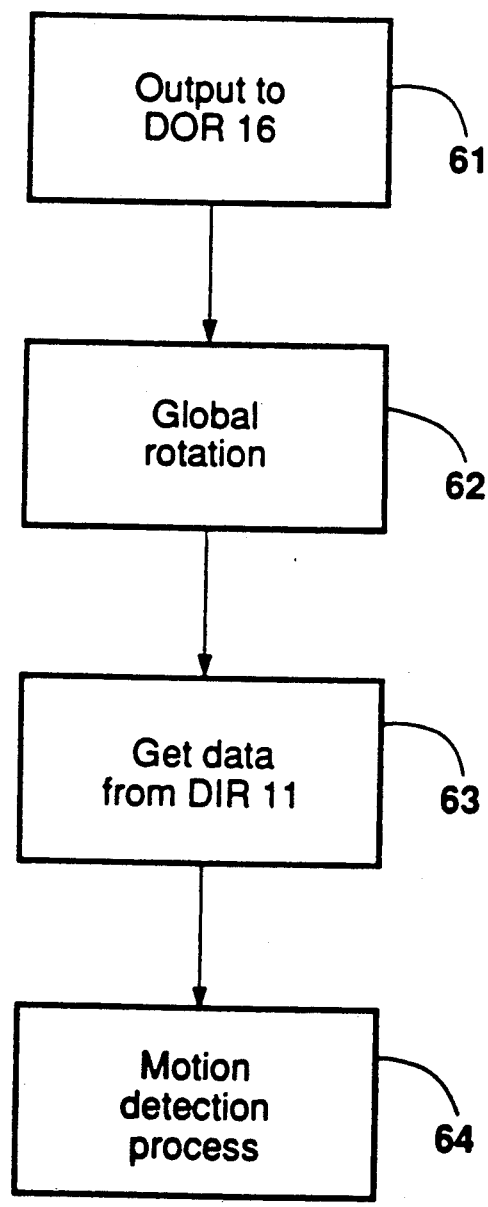
FIG. 6A is a block diagram of the data input and processing steps of a motion detection process.

FIG. 6A is an overview of the process, which includes data input as well as processing steps. As indicated in FIG. 6A, and as stated above, register files R0 12 and R1 15 emulate line memories. This allows SVP 10 to process data from more than one line at a time without time consuming external memory fetches. Thus, steps 61–63 of FIG. 6A involve a "global rotation" process, in which data for an old line is output via DOR 16 and data for a new line is received via DIR 11. For example, if SVP 10 emulates a 5-line memory, line n−5 is output and line n is received.

The process execution begins on a signal from horizontal timing generator 51c, which indicates the start of horizontal blanking. At this time, the previous iteration is complete, i.e., all data from external sources is loaded into DIR 11, all data not to be used is shifted out of DOR 16, and the previous processing is finished.

In step 61, the data calculated during a previous line is transferred to DOR 16 so that it may be shifted out during the upcoming line. Simple move instructions are used to copy data from R0 12 to DOR 16. In step 62, a global rotation step, instruction generator 52 shifts data assigned to a global rotation area. In step 63, now that the previous line's data has been shifted, the current line's data can be input into DIR 11. Again, simple move instructions are used to copy data from DIR 11 to R1 15.

Figure 6B:
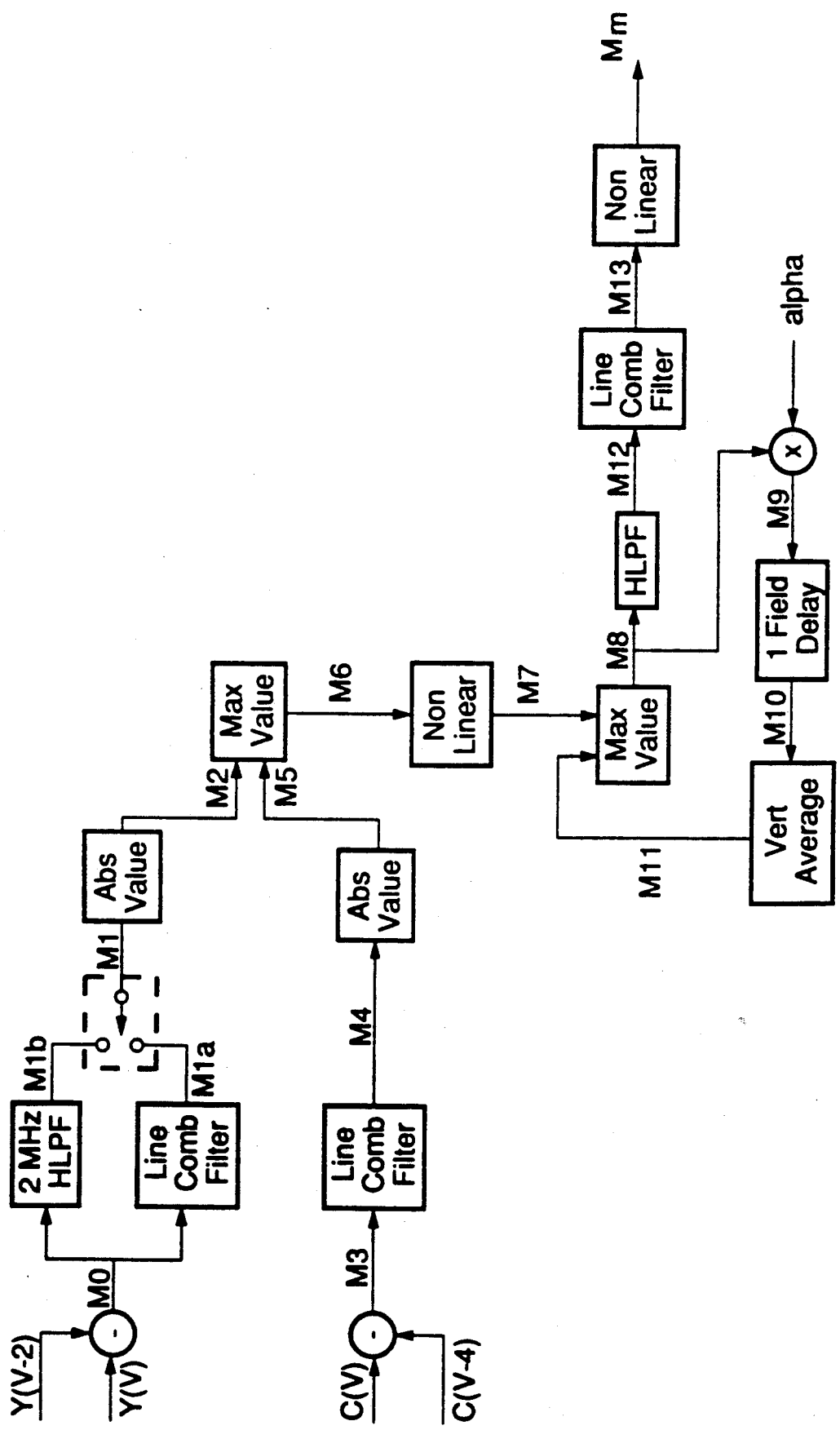
FIG. 6B is a block diagram of details of the motion detection processing of FIG. 6A.

FIG. 6B sets out further detail of the processing step, step 64, of FIG. 6A. The steps described herein correspond to the output signals on FIG. 6B. Thus, for example, the first step corresponds to the obtaining of the M0 signal shown on FIG. 6B. FIG. 6B is best understood with reference to Appendix A, which annotates these steps.

Motion detection methods vary, but in principle, successive frames are compared on a pixel to pixel basis. If the magnitude of the pixel value changes from one frame to the next beyond a predefined threshold, then motion is assumed.

To obtain a motion signal from luminance data, the first step is to subtract successive frames. Because there are two fields per frame, this requires a two-field delayed field. The algorithm is:

$$M0(V) = Y(V) - Y(V-2),$$

where Y(V) is the current luminance data, Y(V−2) is the luminance data from two fields ago, and M0(V) is a current luminance motion signal. The result, M0, contains two components: luminance motion and chrominance cross-talk. The cross talk is undesirable because it represents color information rather than motion information.

For standard signals, a line comb filter step, M1a, is used to comb out the chrominance component. The first "tooth" of the comb filter in the frequency domain is zero frequency and successive teeth are spaced at intervals of fh. Because the gain of the comb filter is unity at zero frequency, it is referred to as a "DC" line comb filter. The function for the filter is:

$$M1a(H-1) = [M0(H) + 2 \cdot M0(H-1) + M0(H-2)]/4,$$

where M0(H) is the current M0 data, M0(H−n) is the M0 data delayed by n horizontal lines, and M1a(H−1) is M1a skewed by 1H relative to M0.

Figure 6C:
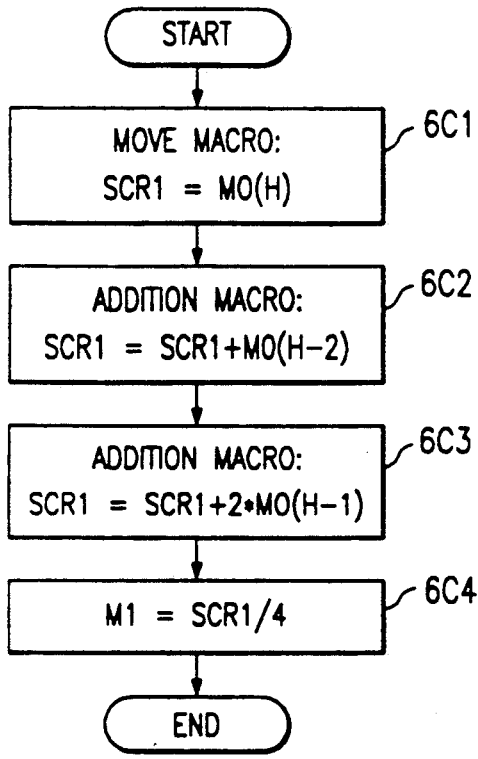
FIGS. 6C—6G are flow diagrams illustrating further detail of various steps of the motion detection processing of FIG. 6B.

FIG. 6C illustrates the steps for using SVP 10 to obtain M1a. SCR1 represents a scratch area used as an accumulator. M0(H−n) is an input value in global rotation space, where n=0...2. Step 6C1 is storing M0(H) data in the accumulator. Step 6C2 is adding M0(H−2) data to the accumulator. Step 6C3 is shifting M0(H−1) up by one bit before addition to the accumulator. Step 6C4 is a division step to compensate for the four addition terms.

For non-standard signals, the comb filter step is not used because there is no phase relationship between the sync pulse and the chroma burst. Instead, a horizontal low pass filter (HLPF) step, M1b, removes the chrominance crosstalk. This filter has the following function:

$$M1b(t) = [-2/x^4 + 1/x^3 + 2/x^2 + 3/x + 8 + 3 \cdot x + 2 \cdot x^{-2} + 1 \cdot x^3 - 2 \cdot x^4]/16,$$

where $x^n$ represents n sample delays. To make use of the L/R communications of SVP 10, the function may be factored into three lower-order terms:

$$= (1/x + 2 + x)/4 \cdot (1/x^2 + 2 + x^2)/4 \cdot (-2/x + 5 - 2 \cdot x).$$

These three terms represent filters that may operate in succession, with the following calculations:

$$M1bi(T) = [M0(T-1) + 2 \cdot M0(T) + M0(T+1)]/4$$

$$M1bj(T) = [M1bi(T-2) + 2 \cdot M1bi(T) + M1bi(T+2)]/4$$

$$M1b(T) = -2 \cdot M1bj(T-1) + 5 \cdot M1bj(T) - 2 \cdot M1bj(T+1)$$

Once the chrominance crosstalk is removed, step M2 is determining the absolute value of M1, which is the magnitude of the luminance motion.

Similar steps, M3-M5, are taken to obtain a chrominance motion signal, except that the delay is a four-field rather than a two-field delay. Thus, $$M3(V) = C(V) - C(V-4)$$

Figure 6D:
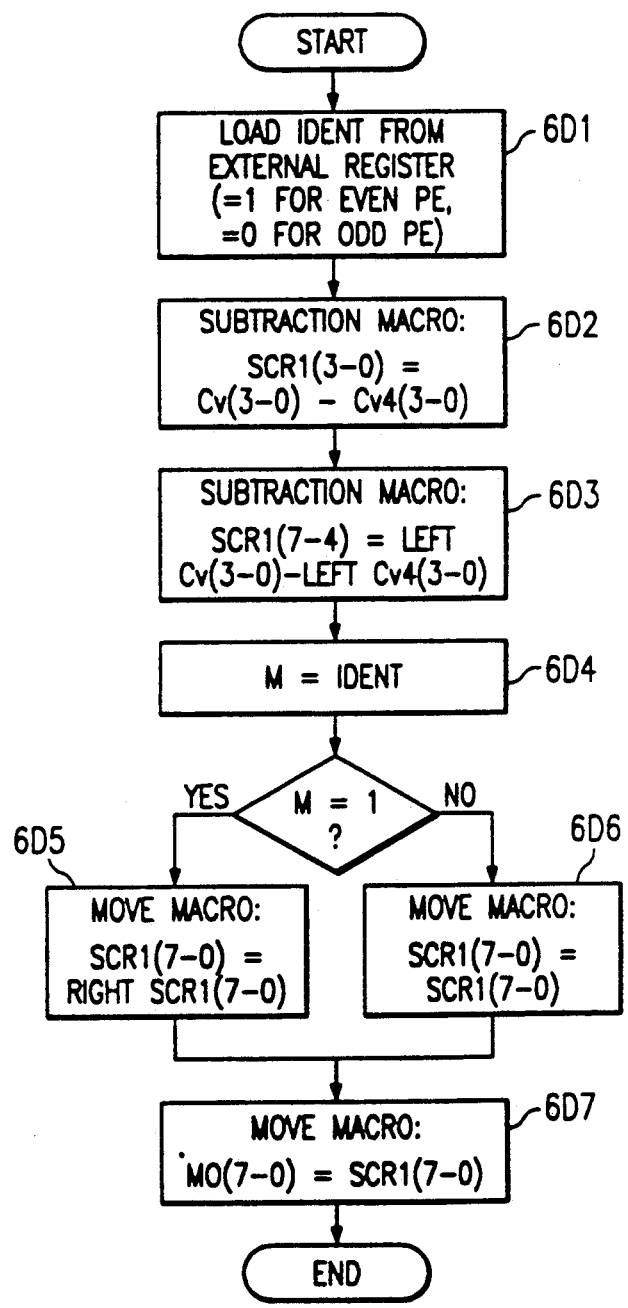

FIG. 6D illustrates, in further detail, the steps for using SVP 10 to obtain M3. The chrominance data is composed of two components: I and Q, which are both 8-bit words. The A/D interface 55e mulitplexes this data such that the input to SVP 10 is in the form of four 4-bitwords. Thus, the data stored in SVP 10 is spread out over 4 PE's 20. The steps of FIG. 6D calculate the desired 8-bit chrominance frame difference. Step 6D1 sets data locations to distinguish between even and odd PE's 20. Step 6D2 calculates the difference in the lower 4 bits of the chrominance data. Step 6D3 calculates the difference in the upper 4 bits of the chrominance data and concatenates. At this point, only odd PE's 20 have valid motion data. Step 6D4 loads WR 13(M) with even/odd PE's identifiers. Depending on the value of M, steps 6D5 and 6D6 move valid data into even PE's 20. Step 6D7 copies data into the global rotation space.

For step M4, a DC line comb filter step has the function:

$$M4(H-1) = [M3(H) + 2*M3(H-1) + M3(H-2)]/4,$$

where M3(H) is the current M3 data, M3(H−n) is the M3 data delayed by n horizontal lines, and M4(H−1) is M4 skewed by 1H relative to M3. This is the same vertical filter as to obtain M1a, with different inputs and outputs. In step M5, as with the luminance data, the absolute value is taken, so that M4 results in M5.

Figure 6E:
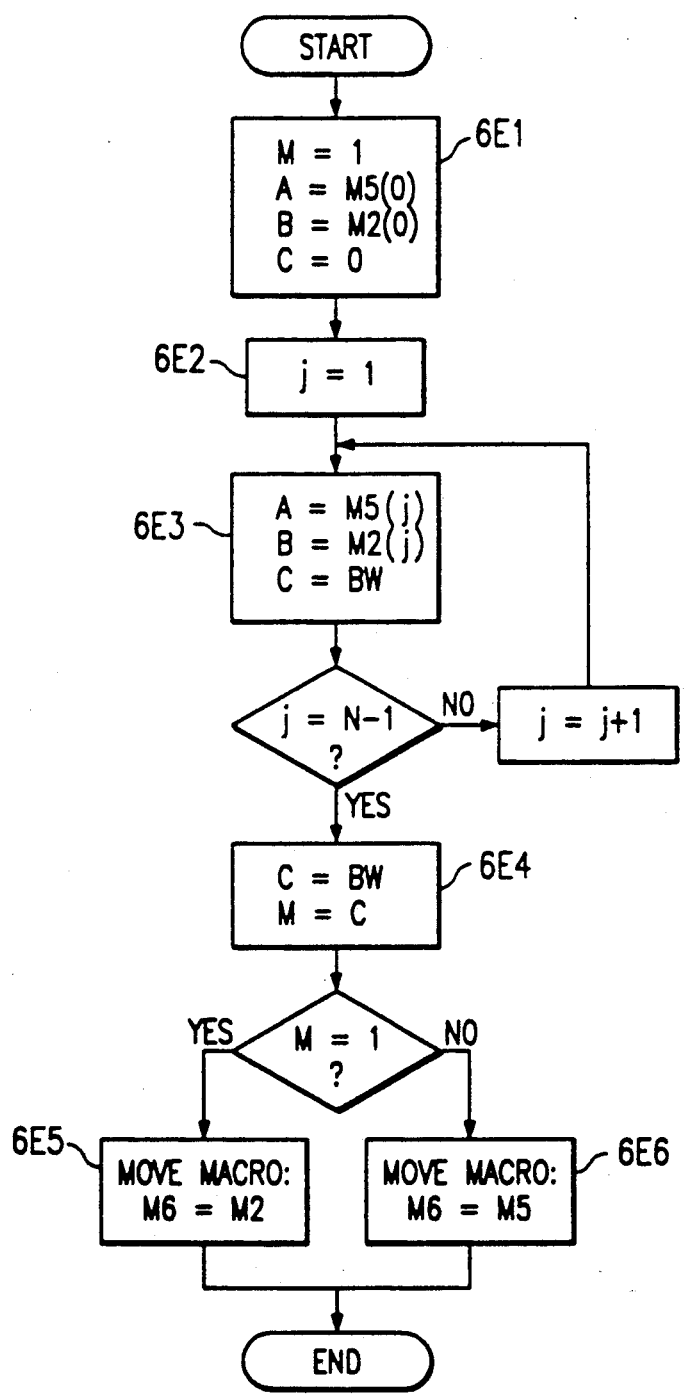

Step M6 takes the maximum value of M2 and M5 to avoid misdetection. At this point, the data is still 8 bits wide. FIG. 6E illustrates the steps of using SVP 10 to obtain M6. Step 6E1 is preparing to subtract M2 from M5. Step 6E2 is initializing a bit index. Step 6E3 is looping N−1 times, where N is the number of bits of M2 and M5. Step 6E4 is saving the sign of the result in WR 13(M), where M=1 if M2>M5 and M=0 if M2<M5. Steps 6E5 and 6E6 depend on the outcome of step 6E4 and move either M2 or M5 into M6.

Because the need to change from temporal to spatial filtering occurs at low ranges of motion, the motion magnitude signal need not be as wide as 8 bits. Thus, the next step, M7, is a nonlinear step for limiting the motion data to 4 bits, or from 0 to 15. Motion values below 4 are assumed to be noise and are trimmed to 0. Motion values from above 19 are assumed to be motion and limited to 15.

The result of the nonlinear step, M7, is compared with feedback motion data, M11, to obtain the maximum value, M8. Steps M9-M11 are a feedback loop. A constant value, alpha, determines loop gain and avoids latch-up. To obtain M11, M8 is multiplied by alpha and fed back to a one-field delay (262H). Alpha is a 4-bit value, 0<alpha<1. In other words:

$$M9 = M8 * alpha$$

$$M10(H) = M9(H-262)$$

The current motion data, M7, is situated between the previous field's motion data. Two one-field delayed lines are interpolated by calculating an average. The function is a two-tap vertical filter, which performs the following calculation:

$$M11 = [M10(H) + M10(H-1)]/2,$$

where M10(H) is a value input from field memory 56, and M10(H−1) is a previous M10(H) value shifted with the use of global rotation.

The output of the feedback steps is M8. To smooth the M8 data and reduce the chance of misdetection due to noise, steps M12 and M13 pass M8 through a horizontal and a DC line comb filter. The function for obtaining M12 is:

$$M12(T-1) = [M8(T) + 2*M8(T-1) + M8(T-2)]/4$$

Figure 6F:
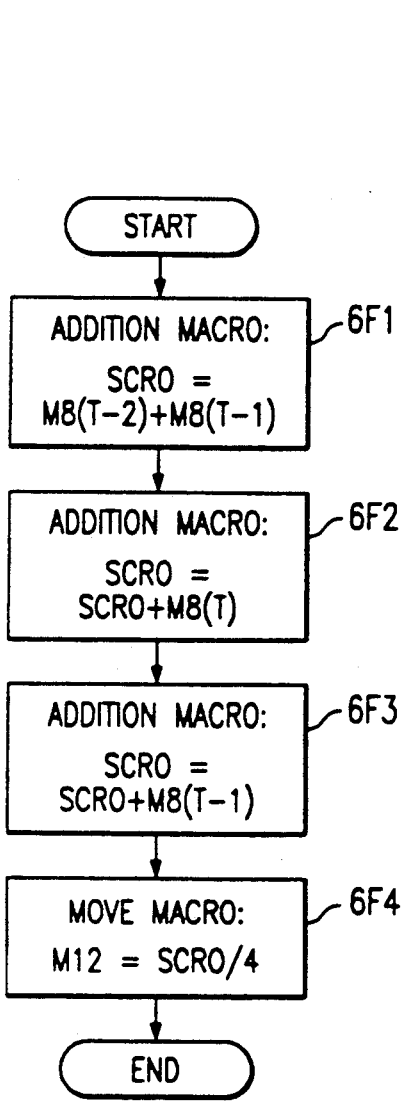

FIG. 6F illustrates the steps for using SVP 10 to obtain M12. SCR0 is a scratch data area used as an accumulator, M8(T) is an input value located in the PE 20 to the left of the reference PE 20, M8(T−1) is an input value located in the reference PE 20, and M8(T−2) is an input value located in the PE 20 to the right of the reference PE 20. Steps 6F1-6F4 are explained in FIG. 6F.

The function for M13 is a five-tap vertical low pass filter:

$$M13(H-2) = [M12(H) + 2*M12(H-1) + 3*M12(H-2) + -2*M12(H-3) + M12(H-4)]/4$$

Figure 6G:
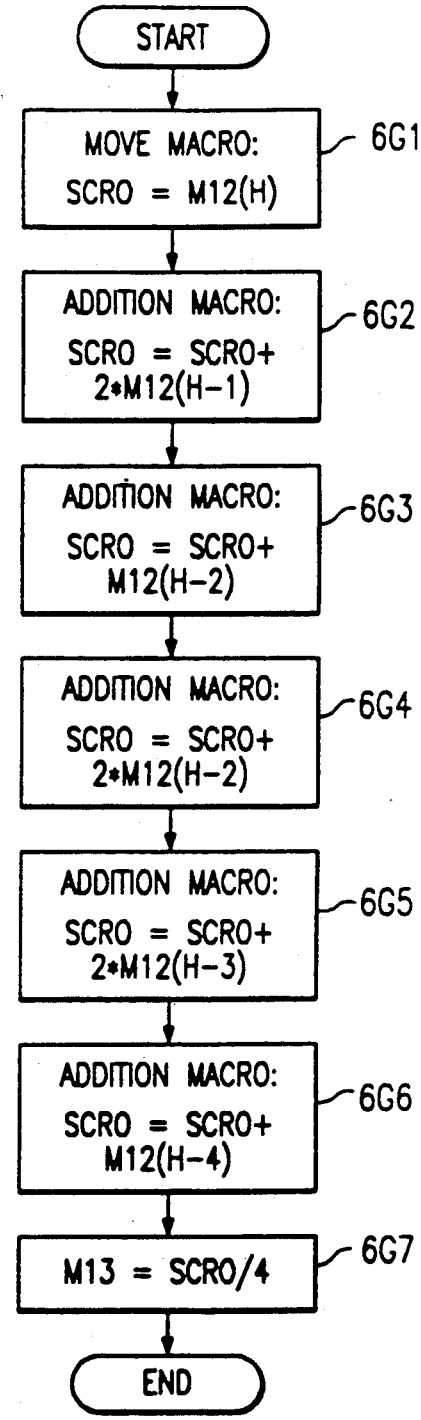

FIG. 6G illustrates the steps to obtain M13, where SCR0 is a scratch area used as an accumulator, M12(H−n) is an input value from global rotation space, n=0 . . . 4. Steps 6G1-6G7 are explained in FIG. 6G.

The final step, Mm, is trimming M13, using a non-linear function to avoid underflow or overflow and to fix the maximum value to 16. Between input values of 0 and 32, there is a proportional mixing of temporally and vertically filtered data. For example, $$M13 = M13/2 \quad \text{for } 0 < = M13 < 32 \text{ (transitional)}$$

$$M13 = 16 \quad \text{for } 32 < M13 \text{ (full motion)}$$

This conversion to a 5-bit motion value with a range of 0 to 16 simplifies the logic in various mixing steps of other IDTV processes that use the motion data.

The motion detector process of FIG. 6B is an alternative to a motion detection process that uses separate motion detection for luminance and chrominance data. Such a process would use the same steps shown in FIG. 6B to obtain M2 and M5, but would not combine them for a maximum value. Instead, separate processing paths would continue for M2 and M5. However, this method would require additional field memory.

Luminance Clean-up Processing

IDTV applications for both component and composite television receiver systems use clean-up processing to remove signal crosstalk. In composite systems, this processing is accomplished in conjunction with Y/C separation, whereas in component systems, this clean-up processing is performed on separated Y and C signals. The basic concepts are the same, but the following description is directed to a component NTSC system.

Figure 7:
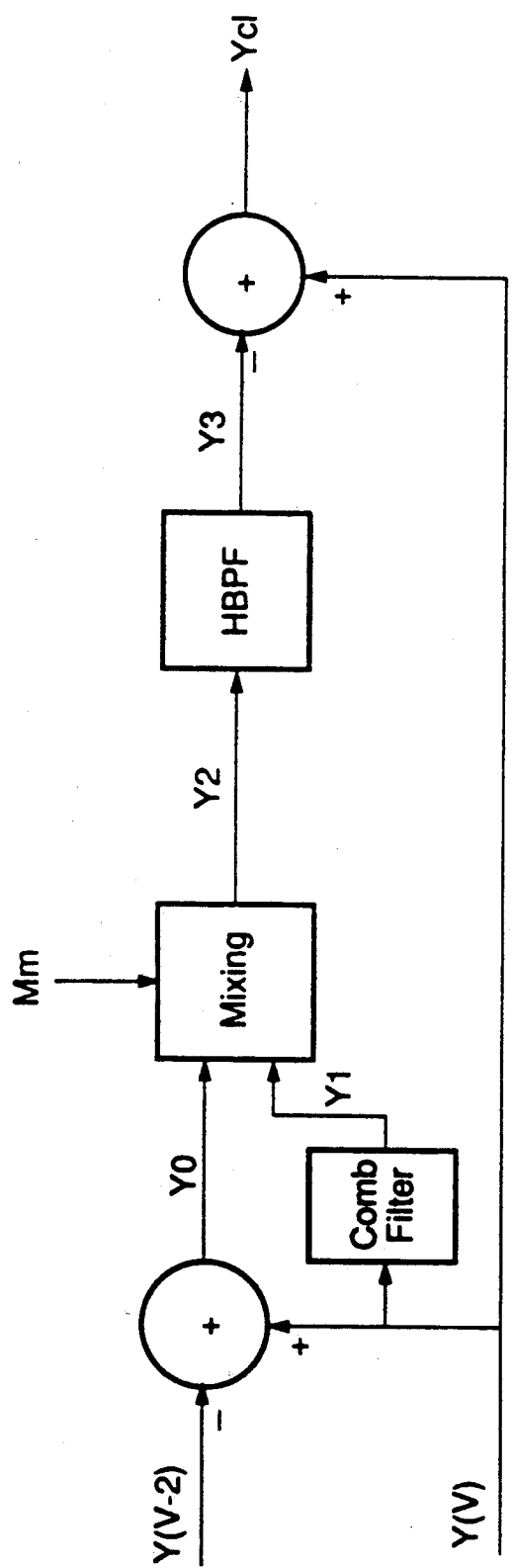
FIG. 7 is a block diagram of the steps of a luminance signal cleaning process.

FIG. 7 is a block diagram of the steps of the IDTV process for cleaning up the luminance signal. Again, the steps are designated in terms of their output signal.

The purpose of this clean-up processing is to remove the residual chrominance information, i.e., cross chrominance, from the separated luminance signal. In general, the cross luminance is detected in the original luminance signal and then subtracted from that signal, to yield a clean luminance signal. A motion signal from a motion detection process, such as the process described above in connection with FIG. 6B, is used to switch between temporal and spatial filtering.

Step Y0 is a temporal filtering step, used for still areas of the picture. Comb filtering separates Y(V) and Y(V−2) to yield the chrominance crosstalk. In other words, $$Y0(V) = Y(V) - Y(V-2)$$

Step Y1 is a spatial filtering step for areas where there is motion. This filtering is implemented with a comb filter, in which the first "tooth" in the frequency domain is at fh/2 and successive teeth are spaced at intervals of fh. Because its gain is zero at a frequency of zero, it is referred to as an "AC" line comb filter. The filter function is:

$$Y1(H-1) = [Y(V(H)) - 2*Y(V(H-1)) + Y(V(H-2))]/4,$$

where Y(V(H)) is a current line of Y(V), Y(V(H−n)) is Y(V) data delayed by n horizontal lines, and Y1(H−1) is Y1 skewed by 1H relative to Y(V).

Figure 8:
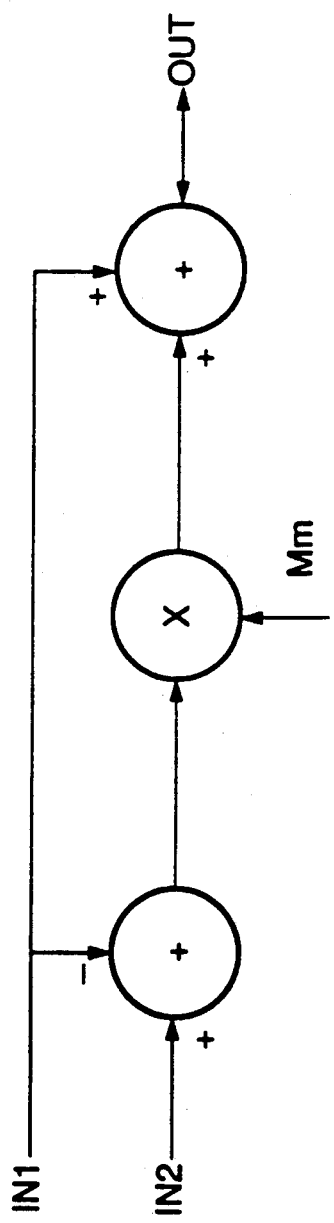
FIG. 8 illustrates the mixing step in the process of FIG. 7.

Step Y2 mixes the Y0 and Y1 signals. FIG. 8 further illustrates this mixing step. A motion signal, Mm, causes a gradual change from the frame comb filter to an AC line comb filter to obtain Y2. The general principle of step Y2 is to ratio the mixing of two inputs such that their sum remains constant. As a results, the circuit gain is unity. A 5-bit motion value permits a range of 0% to 100% mixes. The mixer equation is:

$$OUT = IN1 * (1 - Mm) + IN2 * Mm$$

Rearranging terms, the equation is:

$$OUT = IN1 + Mm * (IN2 - IN1)$$

In terms of the luminance data, the mixing step performs the function:

$$Y2 = Y0 + Mm * (Y1 - Y0)$$

Figure 9:
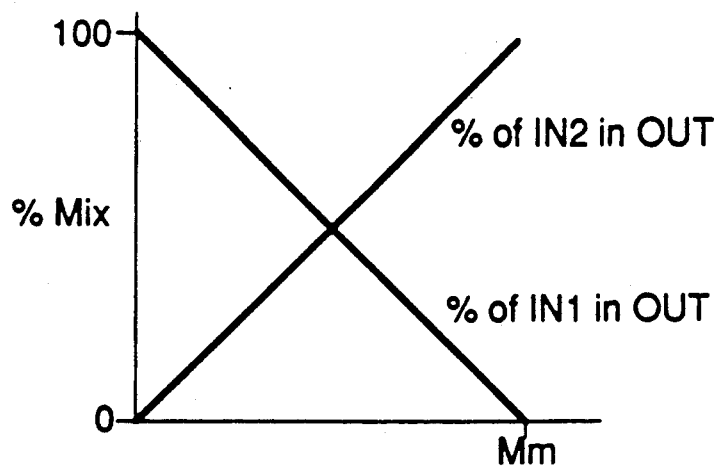
FIG. 9 illustrates the results of the mixing step of FIG. 8.

In the mixer step, Mm is scaled, such as dividing its value by 16. FIG. 9 illustrates the percent mix between the inputs IN1 and IN2 as a function of motion magnitude.

Step Y3 is a horizontal bandpass filtering step. Because the noise being extracted from the luminance signal is composite noise as opposed to baseband noise, its center frequency is at 3.58 MHz. The lower sideband of the chrominance signal is 1.5 MHz below the color carrier frequency, and the upper sideband is 0.5 MHz above. To pass only this frequency range and to filter out luminance, a bandpass filter with the following characteristics is desirable:

$fc$ (center frequency) = 3.58 MHz $fcl$ (lower cutoff frequency) = 2.1 MHz $fch$ (upper cutoff frequency) = 4.1 MHz.

Once this filtering step is performed, the resulting signal, Y3, is the cross chrominance contained in the luminance signal.

Step Yc, which produces the clean luminance signal, is subtracting this cross chrominance from the original luminance signal:

$$Ycl = Y(V) - Y3$$

In a composite, as opposed to a component system, the term "modulated chrominance" is used to refer to undesired color data in a luminance signal. The luminance clean-up process is referred to as Y/C separation, and base-band chrominance is obtained by demodulation.

Chrominance Clean-up Processing

Figure 10:
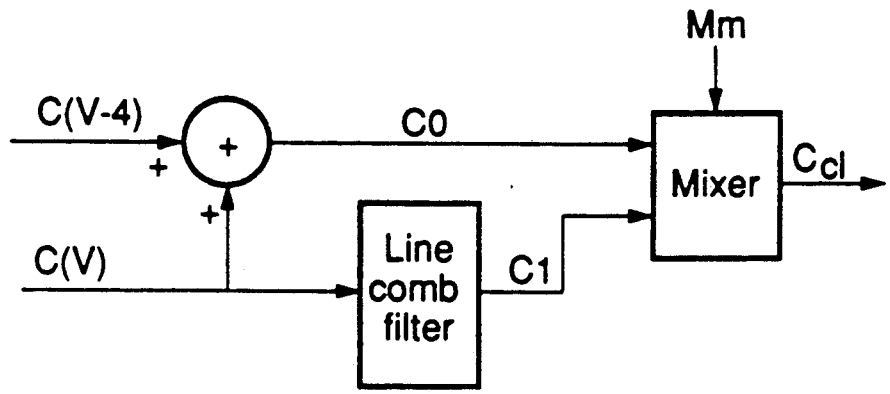
FIG. 10 is a block diagram of the steps of the chrominance signal cleaning process.

FIG. 10 is a block diagram of the steps of the IDTV process of cleaning up the chrominance data. Again, the steps of FIG. 10 are directed to component receivers. The chrominance signal may be extracted from luminance cross talk using a process similar to the process used to extract luminance signal from chrominance crosstalk, except for an important difference: the chrominance signal is a baseband signal because it has been demodulated. Also, because of the lower bandwidth of the chrominance signal, chrominance may be extracted directly to obtain a clean chrominance signal.

In step C0, for the still areas of the picture, separation is performed using a DC frame comb filter step between C(V) and C(V−4):

$$C0 = C(V) + C(V-4)$$

This yields the chrominance signal plus the luminance cross talk.

In step C1, if motion is present, the motion signal causes a gradual change from the frame comb filter to a DC line comb filter, such that:

$$C1(H-1) = [C(V(H)) - 2*C(V(H-1)) + C(V(H-2))]/4,$$

where C1(H−1) is C1 skewed by 1H relative to C(V), C(V(H)) is the current luminance data, C(V), and C(V(H−n)) is C(V) data delayed n horizontal lines.

Step Ccl is a mixing step, similar to the mixing step of FIG. 8, but performs the function:

$$Ccl = C0 + Mm * (C1 - C0)$$

The output of the mixer step is the clean chrominance signal, Ccl.

Non-Interlacing

As indicated above, another IDTV task is non-interlacing. In very general terms, non-interlacing is the process of merging the two interlacing fields that make up one frame and doubling the scan rate. This technique of non-interlacing and doubling the scan rate is sometimes referred to as "progressive scanning".

As well as being temporally spaced, due to the 2:1 interlacing of standard television transmission signals, the images are also offset in the vertical direction by ½ line. Two dimensional processing, i.e., vertical and temporal, is used to merge two successive fields to make and display a complete frame. However, field-to-field motion complicates this process, and requires input from the motion detector process.

Figure 11:
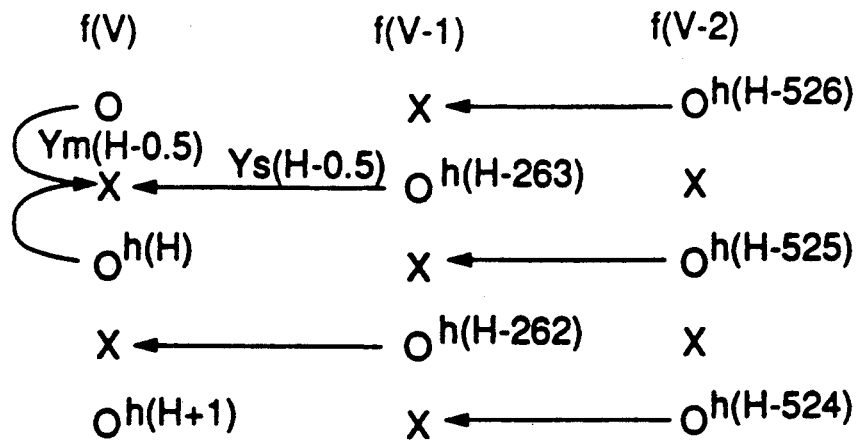
FIG. 11 illustrates the results of non-interlacing process in areas where there is no motion.

Consistent with the above, FIG. 11 illustrates the results of a non-interlacing process in areas where there is no motion. FIG. 11 is best understood by imagining an end view of the lines of one field of the processed picture data, where the "o's" represent data transmitted from the broadcast station, and the "x's" represent data produced by non-interlacing. The lines h(H−1), h(H), and h(H+1) are successive lines in field V. The lines h(H−263) and h(H−262) are successive lines in field V−1, and lines h(H−526), h(H−525), and h(H−524) are successive lines in field (V−2).

The "o" pixels of field f(V−2) move forward to fill in between the "o" pixels of field f(V−1) and so on. Thus, in areas of the received picture in which no motion is detected, each line from the previous field, which has been stored in a field memory, is brought forward and placed between two lines of the current field.

Figure 12:
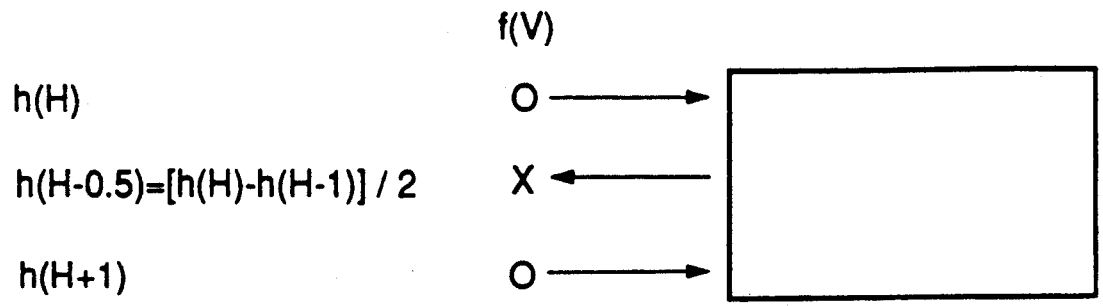
FIG. 12 illustrates the results of a non-interlacing process in areas where there is motion.

FIG. 12 illustrates the results of non-interlacing for the luminance data in areas where there is motion. FIG. 12 illustrates a single field, f(V), where each "x" pixel is created from the average of the two vertically adjacent "o" pixels in the current field. Thus, in areas where motion is detected, the new pixels are created from pixels in the current field rather than from pixels brought forward from a previous field, so that smearing is avoided.

Figure 13:
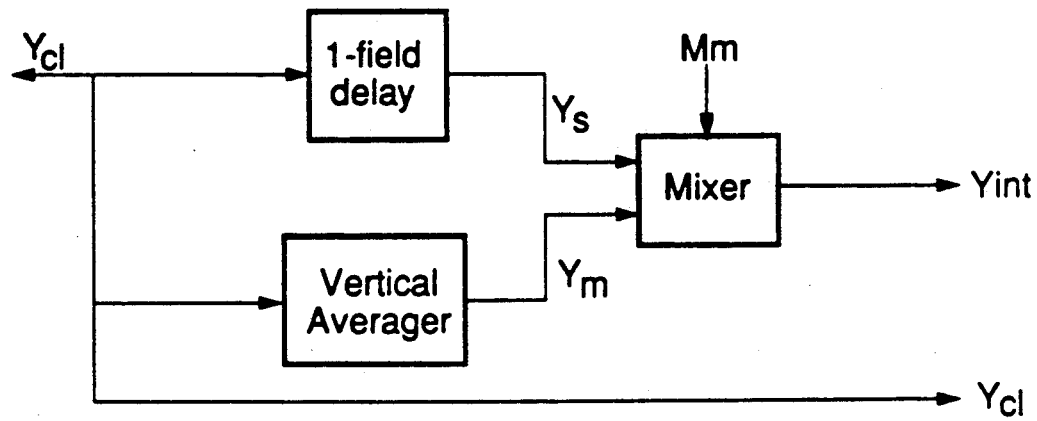
FIG. 13 is a block diagram of the steps of a non-interlacing process for luminance signals.

FIG. 13 is a block diagram of the steps of a non-interlacing process. The input signal is Ycl, indicating that the non-interlacing is being performed on a cleaned up signal. Ys represents still-area luminance data and Ym represents motion-area luminance data.

Step Ys is performing the following function for the still-area data path:

$$Y_s(H-0.5) = Y_{cl}(H-263)$$

Step Ym is performing the following function for the motion-area data path:

$$Y_m(H-0.5) = [Y_{cl}(H) + Y_{cl}(H-1)]/2$$

Step Yint is a mixing step, like the mixing step of FIG. 8. It provides an interpolated line, Yint, with the function:

$$Y_{int} = Y_s + M_d * (Y_m - Y_s)$$

The real line and the interpolated line are scanned to the screen in succession at twice the line rate. The result is twice as many lines per field and the scanning rate is doubled. For example, in an NTSC signal transmission, the result is 525 lines per field at a field rate of 60 fields per second. This process necessitates the doubling of the pixel rate for the luminance output from SVP 10.

Figure 14:
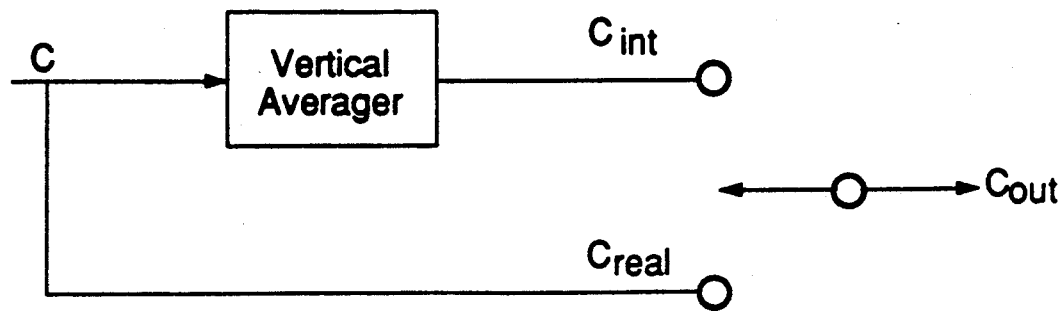
FIG. 14 is a block diagram of the steps of a non-interlacing process for chrominance signals.

FIG. 14 illustrates the process of chrominance non-interlacing, which is simplified by the fact that the chrominance bandwidth is less than that of the luminance signal. Instead of merging the previous field's chrominance signal with the present field's, a simple interpolation between vertical pixels is performed. As with Yout, the data rate of Cout from SVP 10 is doubled. However, after demultiplexing of the data, the data rate of each chrominance signal to D/A unit 56 is 2 fsc.

Contour Compensation

Figure 15:
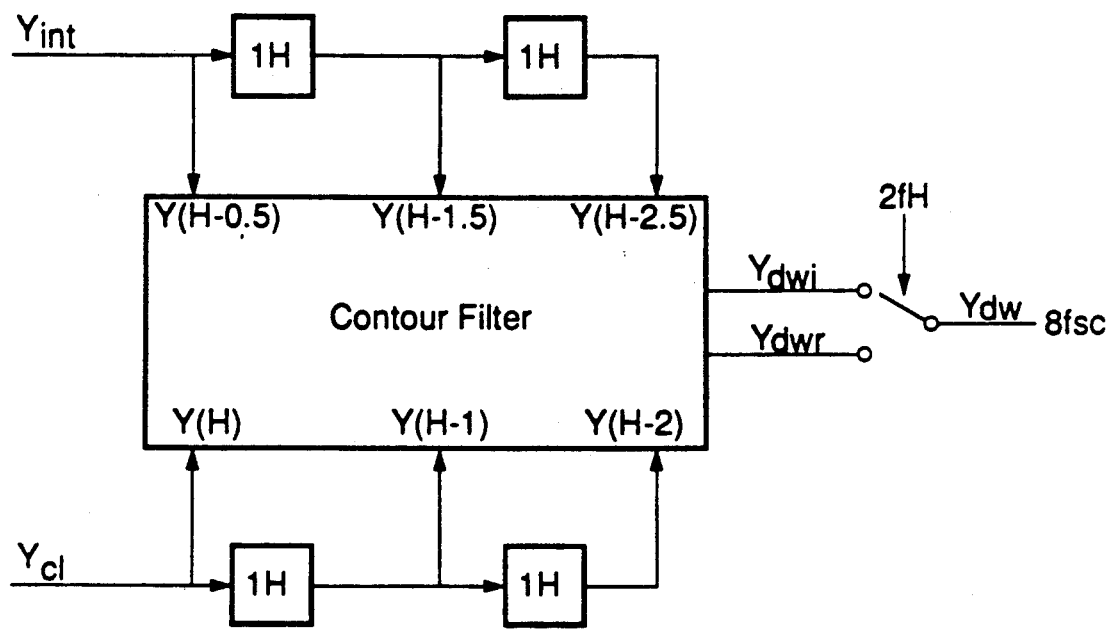
FIG. 15 illustrates a contour compensation process.

The purpose of contour compensation is to sharpen picture edges, or to smooth the texture of the picture and eliminate a grainy appearance. FIG. 15 is a block diagram of a contour compensation process, which receives the real line, Ycl, and the interpolated line, Yint, after a non-interlacing process such as the process of FIG. 13.

Two contour filter processes are used: one for the real line and one for the interpolated line. The processes are identical except for their input and the fact that the inputs are skewed by ½H. The lines are numbered in increments of ½ line because that is the effect of interpolation within a field.

Two lines of pixels, Ydwi and Ydwr, are calculated every 1H period. When the processing of each line is completed, Ydwi is transferred to DOR 16 to be clocked out at 8 fsc, while Ydwr is held in line memory for a period of ½ line. After that holding interval, Ydwr is transferred to DOR 16 and clocked out at 8 fsc. The switching step of FIG. 15 illustrates this step.

Figure 16:
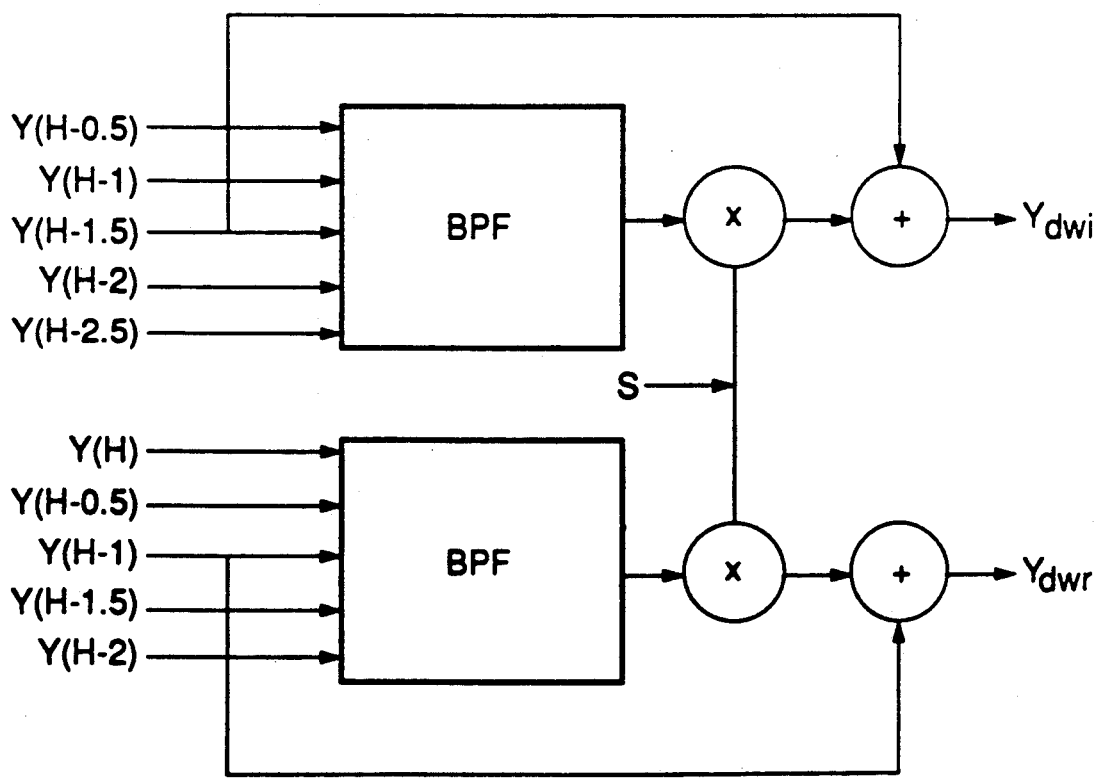
FIG. 16 further illustrates the filtering step of the contour compensation process of FIG. 15.

The filtering process of FIG. 15 is illustrated in FIG. 16. The "S" input is a sharpness input controlled by the user externally, and is a software variable. This input is an example of one of the inputs interpreted by main receiver control unit 58. Each 5×5 bandpass filter (BPF) step calculates five filter functions on each of five horizontal pixels and then combines the results. In practice, the filter is made symmetrical in the vertical direction so that calculations made for line Y(H) can be saved for two line periods and used again as line Y(H−2).

Similarly, calculations made for line Y(H−0.5) may be saved for one line period and used again for line Y(H−1.5).

Component Television Receiver

Figure 17:
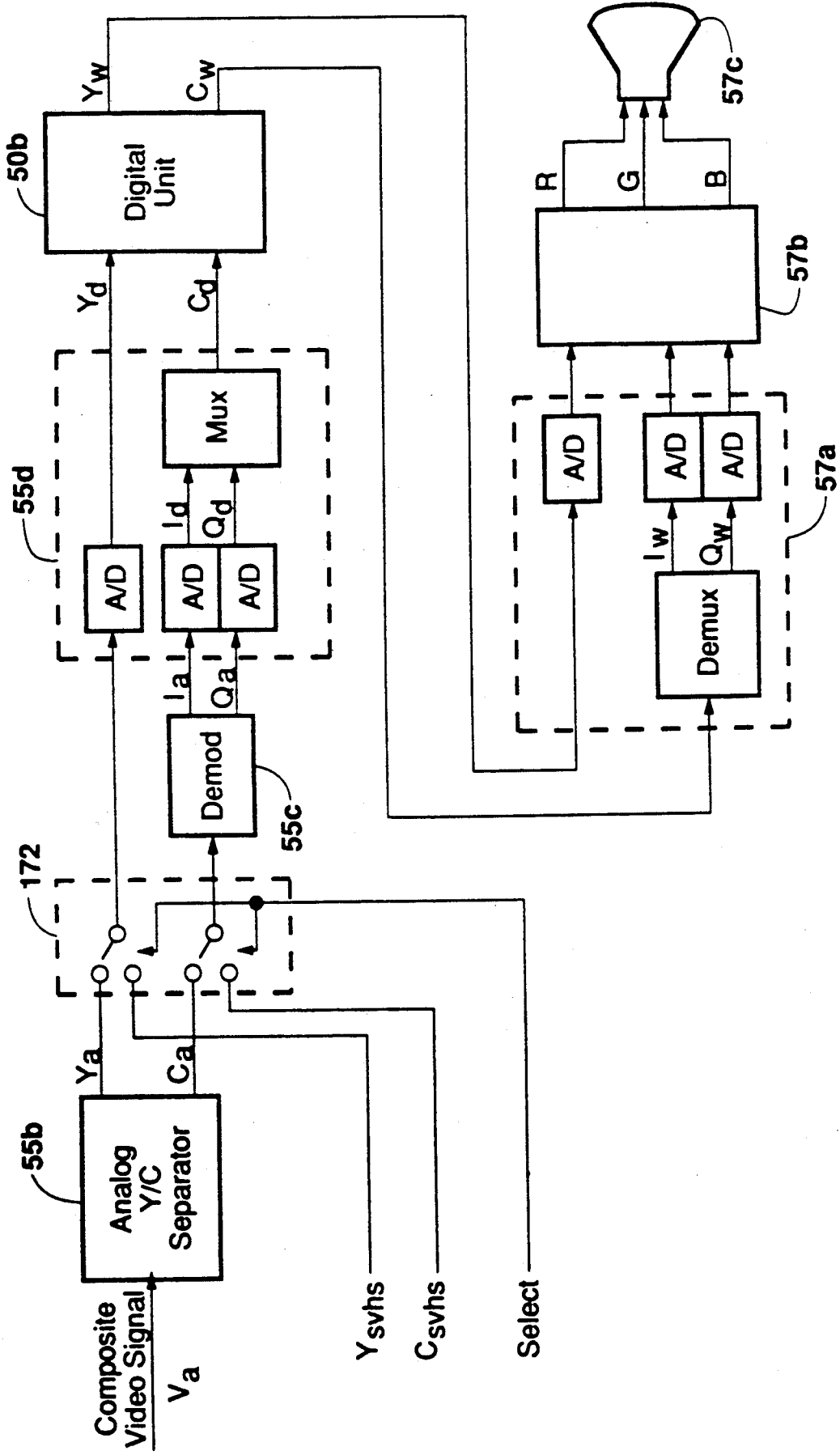
FIG. 17 is a block diagram of a component television receiver for improved definition television.

FIG. 17 illustrates a television receiver, which uses digital unit 50b and component processing to produce an IDTV picture. The system of FIG. 17 is a more particularized version of the system of FIG. 5B, and illustrates that for component processing, digital unit 50b receives component signals, Yd and Cd.

Analog Y/C separation unit 55b converts the composite video signal, Va, into its luminance and chrominance components, Ya and Ca. Signal control unit 172 permits the receiver system to be used with signals from videocassette recorder (VCR) equipment (not shown). Signals from this equipment, Ya(Svhs) and Ca(Svhs) are introduced via switches and used as Ya and Ca. Demodulator 55c demodulates Ca to result in an output of two chrominance signals, Ia and Qa.

A/D unit 55d converts Ya, Ia, and Qa to 8-bit sample signals Yd, Id, and Qd. Also, Id and Qd are multiplexed to 4 bit wide data, Cd, with upper nibble I, lower nibble I, upper nibble Q, and lower nibble Q. For purposes of example herein, the sampling frequency is 4 fsc for Ya and 1 fsc for Ia and Qa, where fsc is the color subcarrier frequency. Thus, the inputs to digital unit 50b are a 4-fsc-sampled 8-bit luminance signal, Yd, and a 4-fsc-sampled 4-bit multiplexed chrominance signal, Cd.

Digital unit 50b includes one or more SVP's 10. For component signals, two two-processor embodiments and a three-processor embodiment are described below in connection with FIGS. 18–22. As will be explained, digital unit 50b performs the IDTV tasks of motion detection, elimination of cross luminance and cross chrominance, and non-interlacing. Another process that may be performed by digital unit 50b is known as shape detection, which produces a signal, Sd, used to change the nature of vertical and horizontal filters in digital unit 50b, depending on the shape of the picture.

From digital unit 50b, the processed video data signals Yw and Cw are output in parallel, as 8-bit words to D/A unit 57a. The resulting signals are Yw, Iw and Qw, with Cw being first demultiplexed into Iw and Qw. Display unit 57b converts Yw, Iw, and Qw into red, green, and blue signals for display on display 57c.

Processor System for Component Television (2 SVP's)

Figure 18:
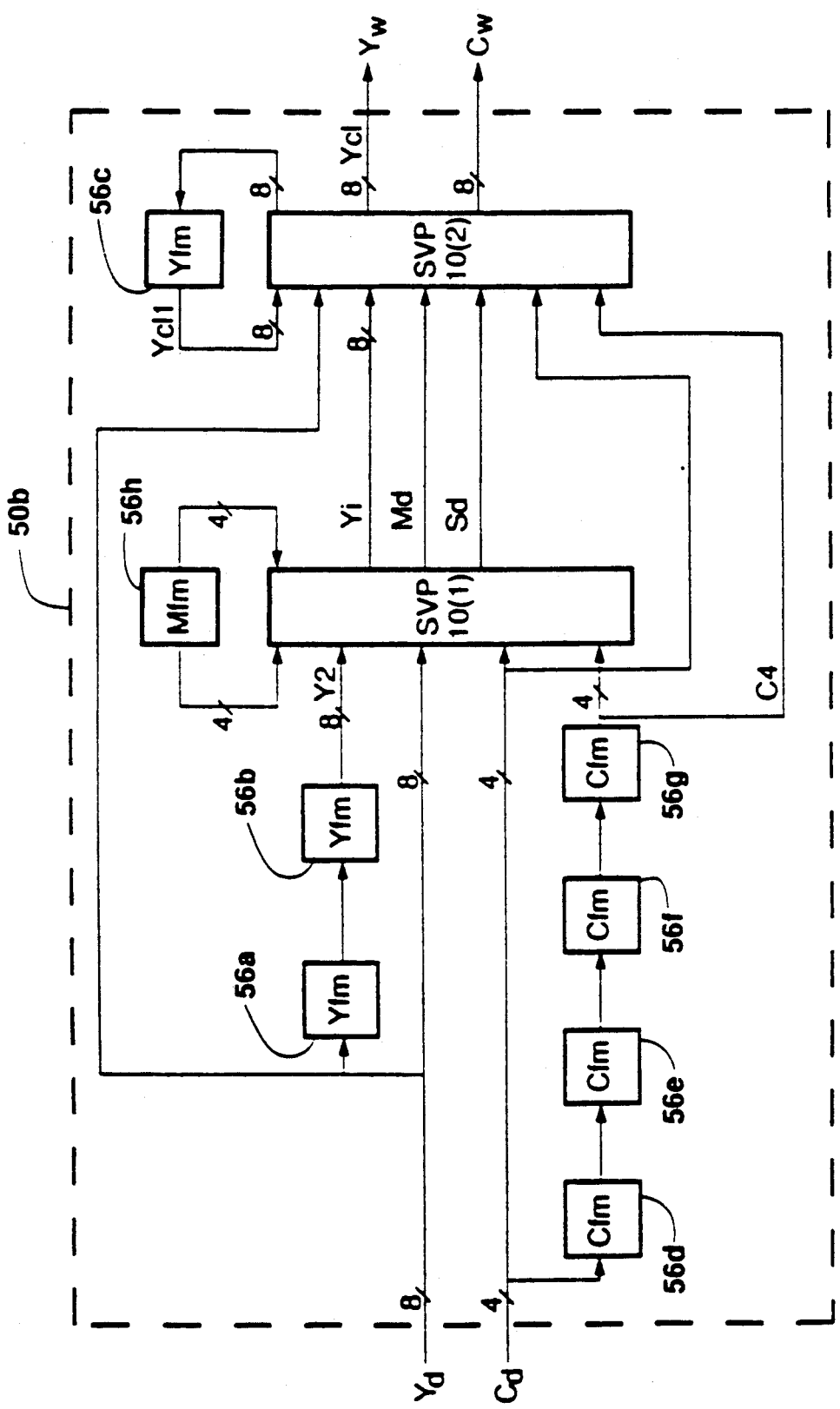
FIG. 18 is a block diagram of the digital unit of FIG. 5B, having two processors and used in the receiver of FIG. 17.

FIG. 18 illustrates one embodiment of digital unit 50b, which uses two SVP's 10. FIG. 18 shows only each SVP 10 and not control unit 51 or instruction generator 52, but it should be understood that digital unit 50b also includes these components. As explained above in connection with FIGS. 5A and 5B, each SVP 10 is associated with its own instruction generator 52, but may share a control unit 51.

The other components of digital unit 50b comprise various field memory devices 56, specifically, three luminance field memories (Yfm) 56a–56c, four chrominance field memories (Cfm) 56d–56g and a motion field memory (Mfm) 56h. A typical memory size for a luminance field memory is 256K by 8 bits. A typical size for a motion field memory or a chrominance field memory is 256K by 4 bits.

As explained above, the data inputs to digital unit 50b are Yd and Cd, where Yd is a 4-fsc-sampled 8-bit luminance signal and Cd is a 4-fsc-sampled 4-bit multiplexed chrominance signal.

Figure 19C:
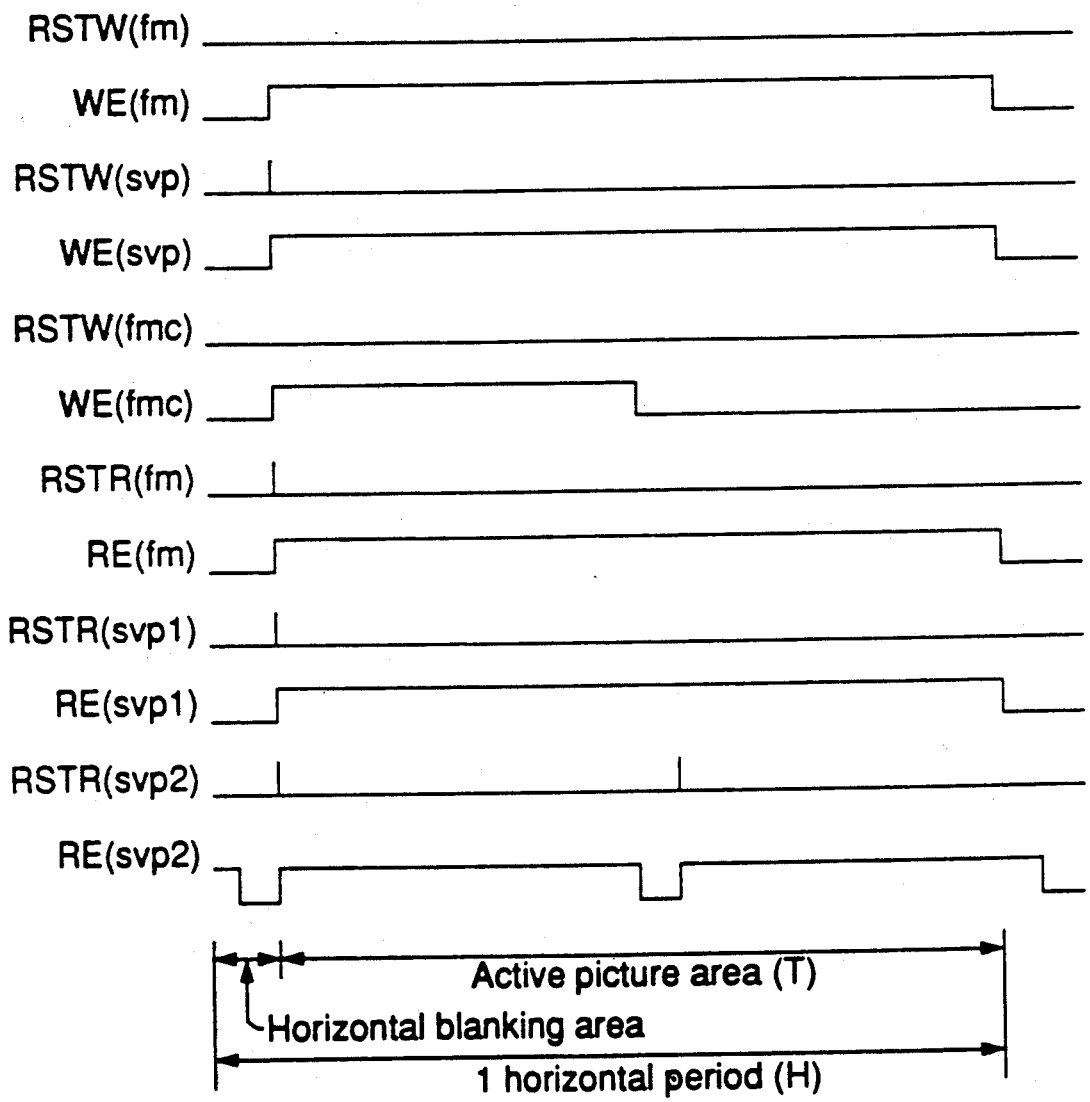

FIG. 18 is best understood with reference to FIGS. 19A–19C, which are timing diagrams of various control signals. As explained above in connection with FIGS. 1 and 2, RSTW (SVP) and WE (SVP) are the write control signals. The same write control signals are used for both SVP 10(1) and SVP 10(2). RSTR(svp1) and RE(svp1) are read control signals for SVP 10(1), and RSTR(svp2) and RE(svp2) are read control signals for SVP 10(2). RSTW(fm), WE(fm), RSTR(fm), and RE(fm) are the write and read control signals for all of the field memories, except luminance field memory 56c. The write control signals for the latter field memory are RSTW(fmc) and WE(fmc).

T is the period of the active picture area for one line of picture data. This period plus a period of time representing the horizontal blanking areas is the period of one horizontal line, or 1H.

Luminance field memories 56a and 56b each delay Yd for one field period. The output of luminance field memory 56b is a two-field delayed luminance data signal, Y2.

Chrominance field memories 56d–56g each delay Cd for one field period. The output of chrominance field memory 56g is a four-field delayed chrominance data signal, C4.

SVP 10(1) detects the motion and shape of incoming video data, using Yd, Y2, Cd, and C4. Depending on the speed of the algorithms being used, luminance clean-up may be performed by SVP 10(1) or SVP 10(2), or the clean-up processing tasks may be partitioned between among them. In FIG. 18, for example, one output of SVP 10(1) is pre-processed luminance data, Yi, indicating that the clean-up processing tasks are partitioned and that Yi is intermediate data. Other outputs of SVP 10(1) are detected motion data, Md, and shape data, Sd.

Motion field memory 56h is used for temporal filtering to smooth the motion data. This smoothing is part of the motion detection process described in connection with FIG. 6B. The input and output of motion field memory 56h are M9 and M10 of FIG. 6B.

SVP 10(2) removes the cross chrominance from the luminance signal, using Yd, Yi, Md, and Sd. This results in a cleaned luminance signal, Ycl.

Luminance field memory 56c delays Ycl for one field period. Its output is a one-field delayed Ycl signal, Ycl1. As shown in FIG. 19C, the writing rate of luminance field memory 56c is twice its reading rate. It writes only one half of one horizontal period.

For non-interlacing, SVP 10(2) interpolates the luminance scanning line, using Ycl, Ycl1, and Md. Also, SVP 10(2) removes cross luminance from the chrominance signal. It then interpolates the chrominance scan line, using Cd, C4, and Md.

The read/write clock frequency of each field memory 56 and each SVP 10 of digital unit 50b is 4 fsc, except for the write frequency of luminance field memory 56c and the read frequency of SVP 10(2). These latter frequencies are 8 fsc because of the need to double the data rate after non-interlacing. Although reading Ycl from SVP 10(2) and writing Ycl into field memory 56c can be at 4 fsc, reading out data from either SVP 10 cannot be at different clock speeds, and is therefore 8 fsc.

Referring to FIGS. 19A and 19B, during the vertical blanking area, all control signals are inactive (low) during the vertical blanking area except for one line. During this one line, RSTW(fm), RSTW(fmc), and RSTR(fm) become active (high) at least once during the vertical blanking area. This activation resets the address counter of the associated field memory.

As shown in FIG. 19C, during the active picture area, WE(fm), WE(fmc), WE(SVP), RE(fm), and RE(svp1) become active once. RE(svp2) becomes active twice to scan twice during one horizontal period. When WE(SVP), RE(svp1), and RE(svp2) become active, RSTW(SVP), RSTR(svp1) and RSTR(svp2) also become active.

Figure 20:
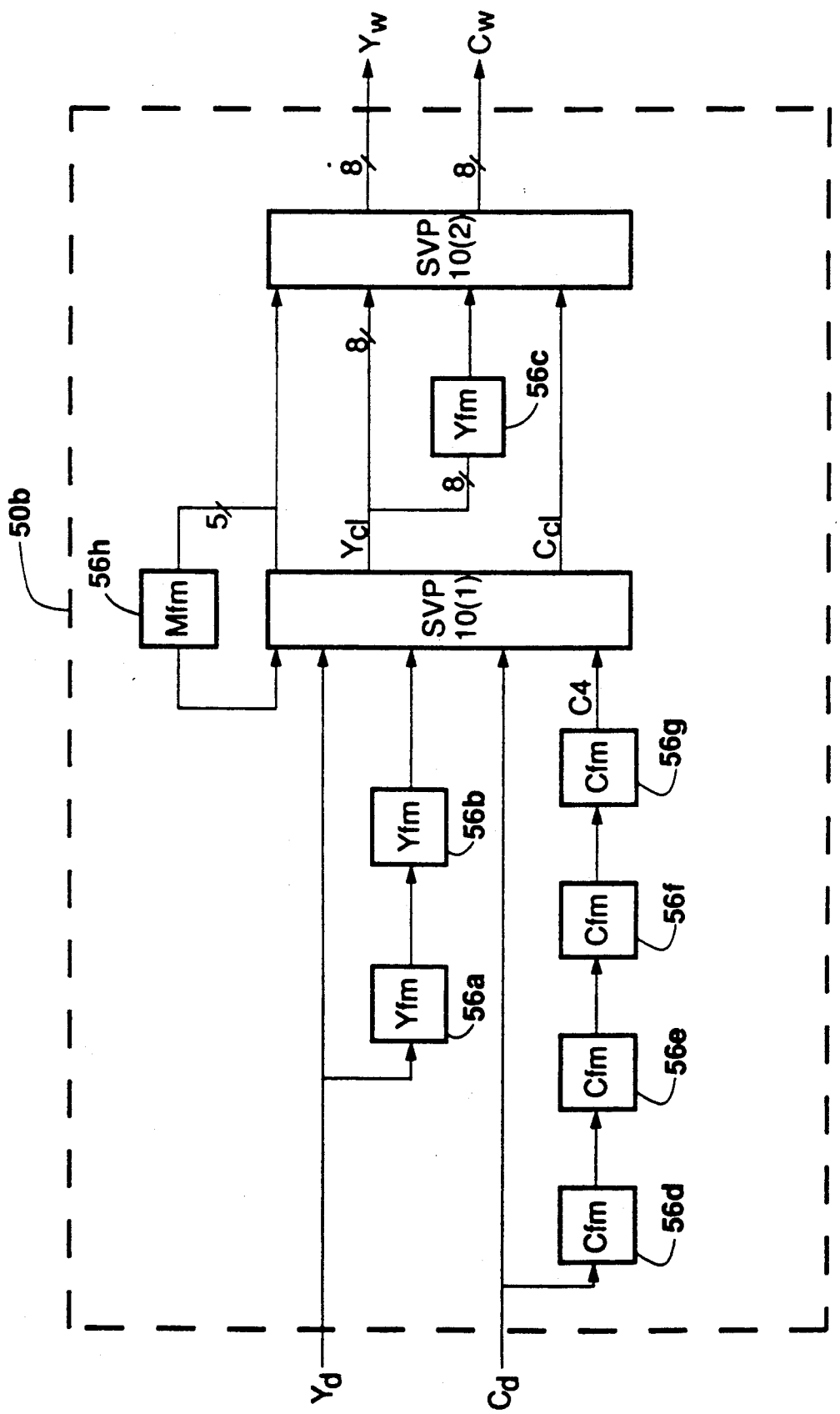
FIG. 20 is an alternative embodiment of the two-processor digital unit of FIG. 18.

FIG. 20 is an alternative embodiment of a two-processor digital unit 50b for use in a component receiver. This embodiment may provide such IDTV tasks as chrominance and luminance clean-up, non-interlacing, and contour compensation.

Two field memories 56a and 56b provide field delayed Yd signals and field memories 56d–56g provide field delayed and Cd signals. Field memory 56h provides a one-field delayed motion data signal, Mm.

SVP 10(1) provides motion detection, motion data smoothing, and removes cross luminance and cross chrominance. The outputs of SVP 10(1) are Mm, a cleaned luminance signal, Ycl, and a cleaned chrominance signal, Ccl.

Field memory 56c provides a one-field delayed luminance signal, Ycl1, which together with the outputs of SVP 10(1), are delivered to SVP 10(2). SVP 10(2) provides scan line interpolation and contour compensation. Its outputs are Yw and Cw as in all other embodiments of digital unit 50b.

Processor System for Component Television (3 SVP's)

Figure 21:
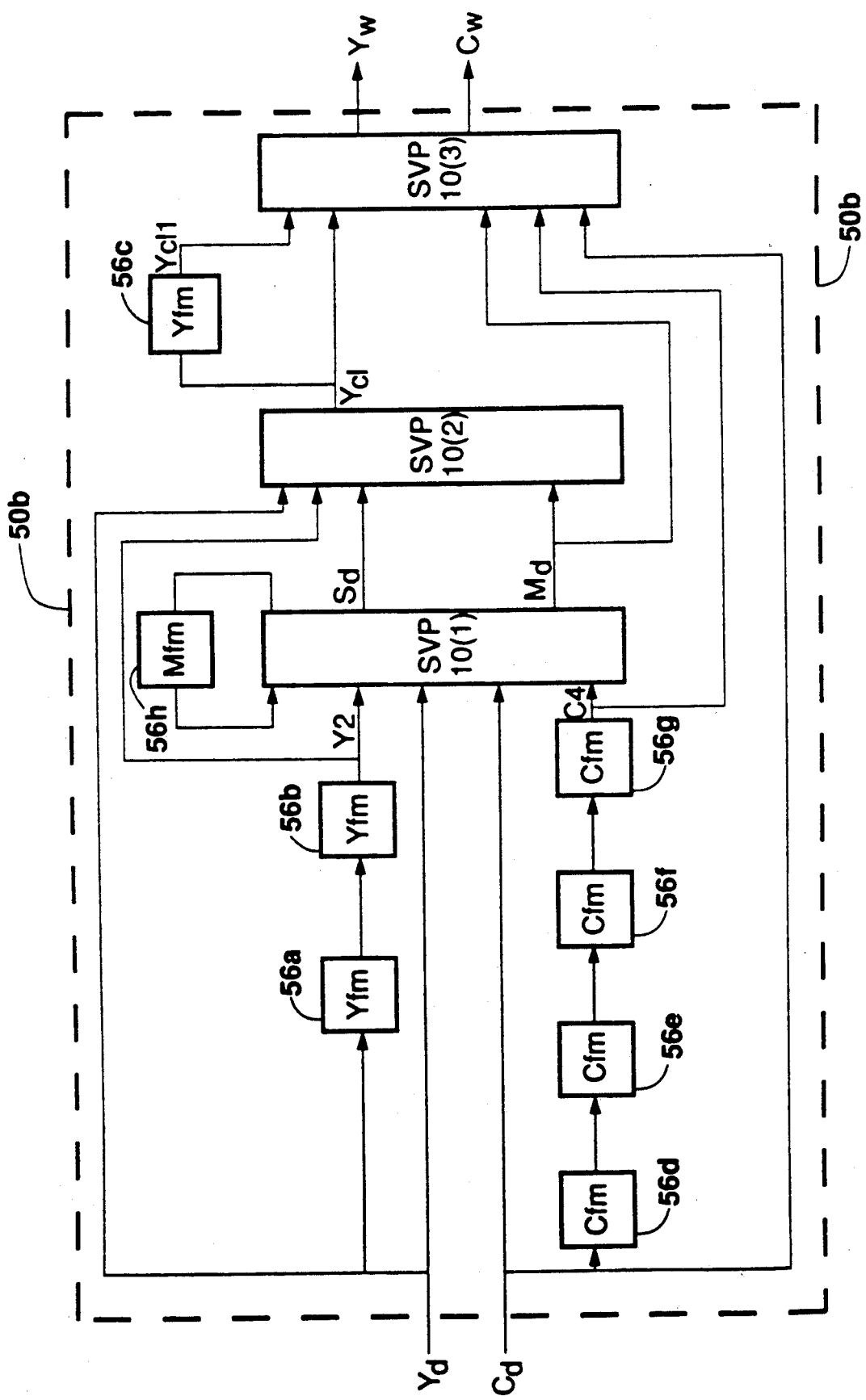
FIG. 21 is a block diagram of the digital unit of FIG. 5B, having three processors and used in the receiver of FIG. 17.

FIG. 21 is a block diagram of a three-processor embodiment of digital unit 50b, as compared to the two-processor embodiment of FIG. 18. There are many similarities between the embodiments of FIGS. 18 and 21. The data rates and the content of the input and output data signals, Yd, Cd, Yw, and Cw are the same. Both embodiments use the same number of field memories 56a-56h. The luminance field memories 56a and 56b, chrominance field memories 56d-56g, and motion field memory 56h are the same, with each being used to provide input to SVP 10(1). SVP 10(1) detects the motion and shape of incoming data and outputs motion and shape data signals, Md and Sd.

The primary difference between the two-processor and the three-processor embodiments of digital unit 50b is that in the three-processor embodiment, the processing after SVP 10(1) is divided between two processors. The luminance field memory, 56c, is no longer a feedback memory into SVP 10(2), but rather is a delay in the input signal to SVP 10(3). Also, SVP 10(2) does not provide a pre-processed luminance data signal Yi.

SVP 10(2) removes the chrominance crosstalk from the luminance data, using Yd, Y2, Md, and Sd. SVP 10(2) outputs a cleaned luminance signal, Ycl, which may be delayed one field by luminance field memory 56c to obtain Ycl1.

For non-interlacing, SVP 10(3) interpolates the luminance scanning line, using Ycl, Ycl1, and Md. Only the current field data, Ycl, is used for interpolation of the motion part of the picture. Only the one-field delayed data Ycl1 is used for interpolation of the stationary part of the picture. Also, intermediate states are detected, in which both Ycl and Ycl1 are used for interpolation, with the ratio of Ycl and Ycl1 being a function of Md. SVP 10(3) also removes the luminance crosstalk from the chrominance data, using Cd, C4, Sd, and Md. SVP 10(3) then interpolates the chrominance scanning line.

Because of the scan conversion, the output data rate of SVP 10(3), i.e., the data rate of Cw and Yw, is twice its input rate. In the example of FIG. 21, the output rate is 8 fsc, as compared to the input rate of 4 fsc. The read/write clock frequencies of each field memory 56 and each SVP 10 is 4 fsc, except for the read frequency of SVP(3). This latter frequency is 8 fsc.

Figure 22C:
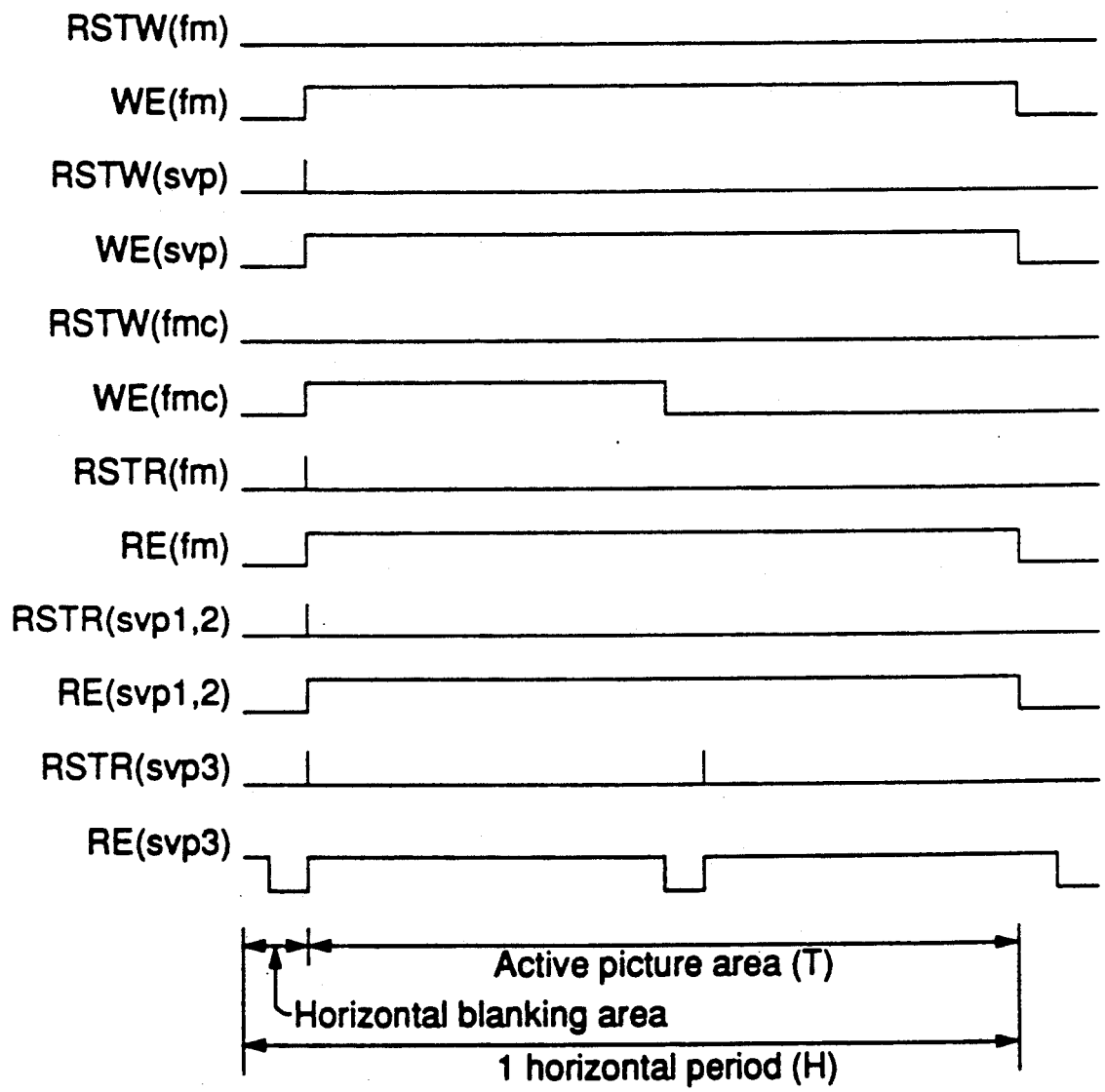

FIG. 21 is best understood with reference to FIGS. 22A-22C, which are timing diagrams of various control signals. As explained above in connection with FIGS. 1 and 2, RSTW(SVP) and WE(SVP) are write control signals. The same write control signals are used for all SVP's 10. RSTR(svp1,svp2) and RE(svp1,svp2) are the read control signals for SVP 10(1) and SVP 10(2). RSTR(svp3) and RE(svp3) are the read control signals for SVP 10(3). RSTW(fm), WE(fm), RSTR(fm), and RE(fm) are the write and read control signals for all of the field memories.

Referring to FIGS. 22A and 22B, during operation of the receiving system, all of the control signals are inactive (low) during the vertical blanking area except for one line. During this one line, RSTW(fm) and RSTR(fm) become active (high) at least once during the vertical blanking area. This activation resets the address counter of the associated field memory.

As shown in FIG. 22C, during the active picture area, WE(fm), WE(SVP, RE(fm), and RE(svp1,svp2) become active once. RE(svp3) becomes active twice to scan twice during one horizontal period. When WE(SVP), RE(svp1,svp2), and RE(svp3) become active, RSTW(SVP), RSTR(svp1,svp2) and RSTR(svp3) also become active.

SVP Video Applications for Composite Television

Figure 23:
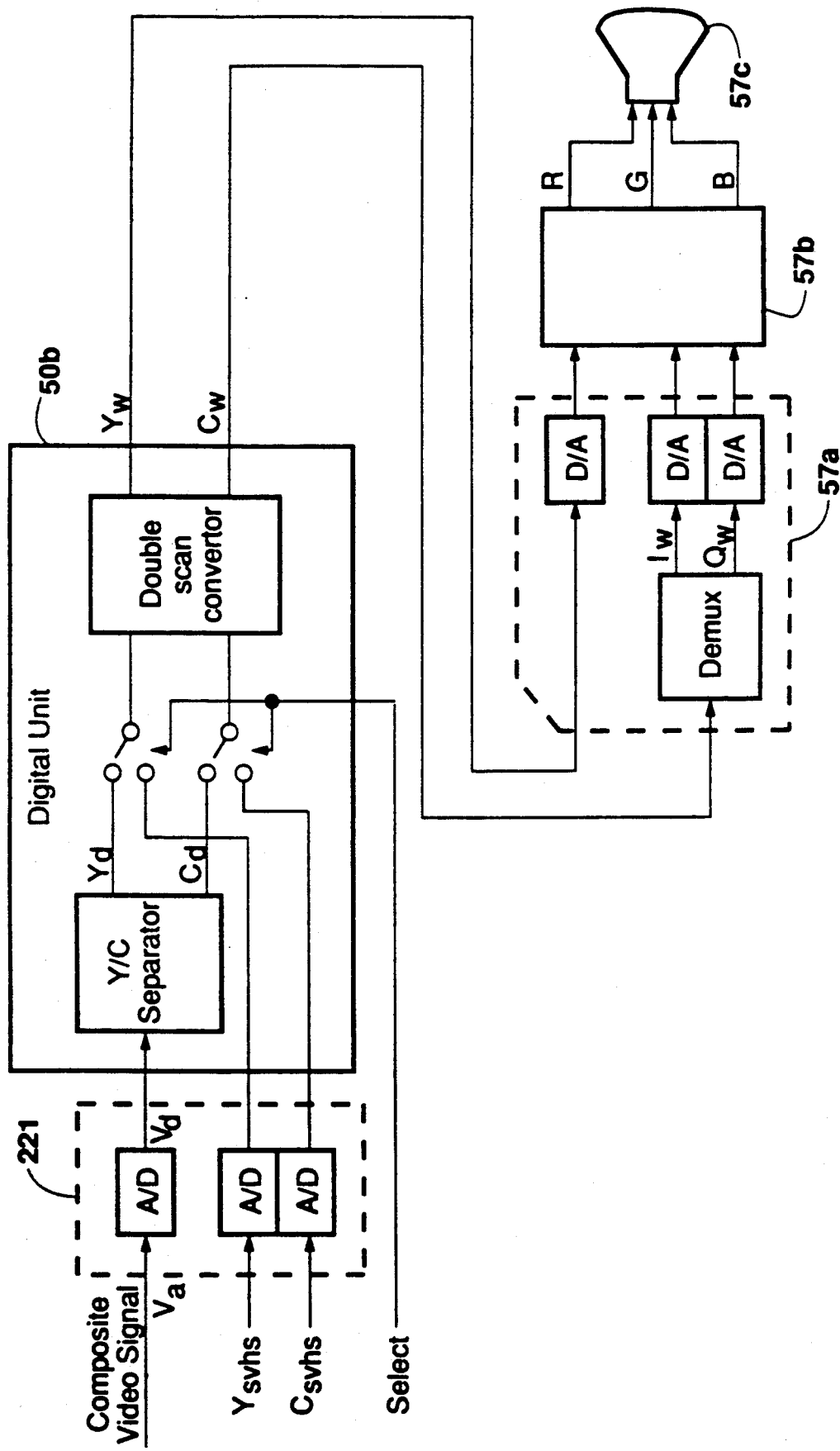
FIG. 23 is a block diagram of a composite television receiver for improved definition television.

FIG. 23 illustrates a television receiver, which uses digital unit 50b and composite processing to produce an IDTV picture. Like FIG. 17, FIG. 23 is a more particularized version of FIG. 5B. However, in contrast to FIG. 17, FIG. 23 illustrates that for composite processing, digital unit 50b receives a digitized composite signal, Vd. Luminance and chrominance separation is performed digitally by digital unit 50b rather than by analog Y/C separator 55b. Once a chrominance signal is extracted, its two components, i.e., I and Q for NTSC or U and V for PAL, are demodulated.

Like digital unit 50b of FIG. 17, for purposes of example herein, the sampling frequency is 4 fsc. Thus, the input to digital unit 50b is a 4-fsc-sampled 8-bit composite video signal, Vd. Digital unit 50b loads, processes, and outputs data for each pixel on a horizontal line in parallel.

As indicated above, one of the functions of digital unit 50b is Y/C separation. The various other processing functions performed by digital unit 50b may include motion detection, shape detection, luminance and chrominance signal clean-up processing, non-interlacing, and contour compensation.

Digital unit 50b also provides signal control to permit the receiver system to be used with signals from video-cassette recorder (VCR) equipment. If S-VHS equipment is being used, its signal is converted in the same manner, except that the incoming signal will produce both a luminance and chrominance data signal, Yd and Cd. Digitized signals from this equipment, Yd(svhs) and Cd(svhs), are introduced via switches, and are used as Yd and Cd.

After processing, the treatment of the processed video data signals, Yw and Cw, is the same as with the receiver system of FIG. 5B.

Processor System for Composite Television (2 SVP's)

Figure 24:
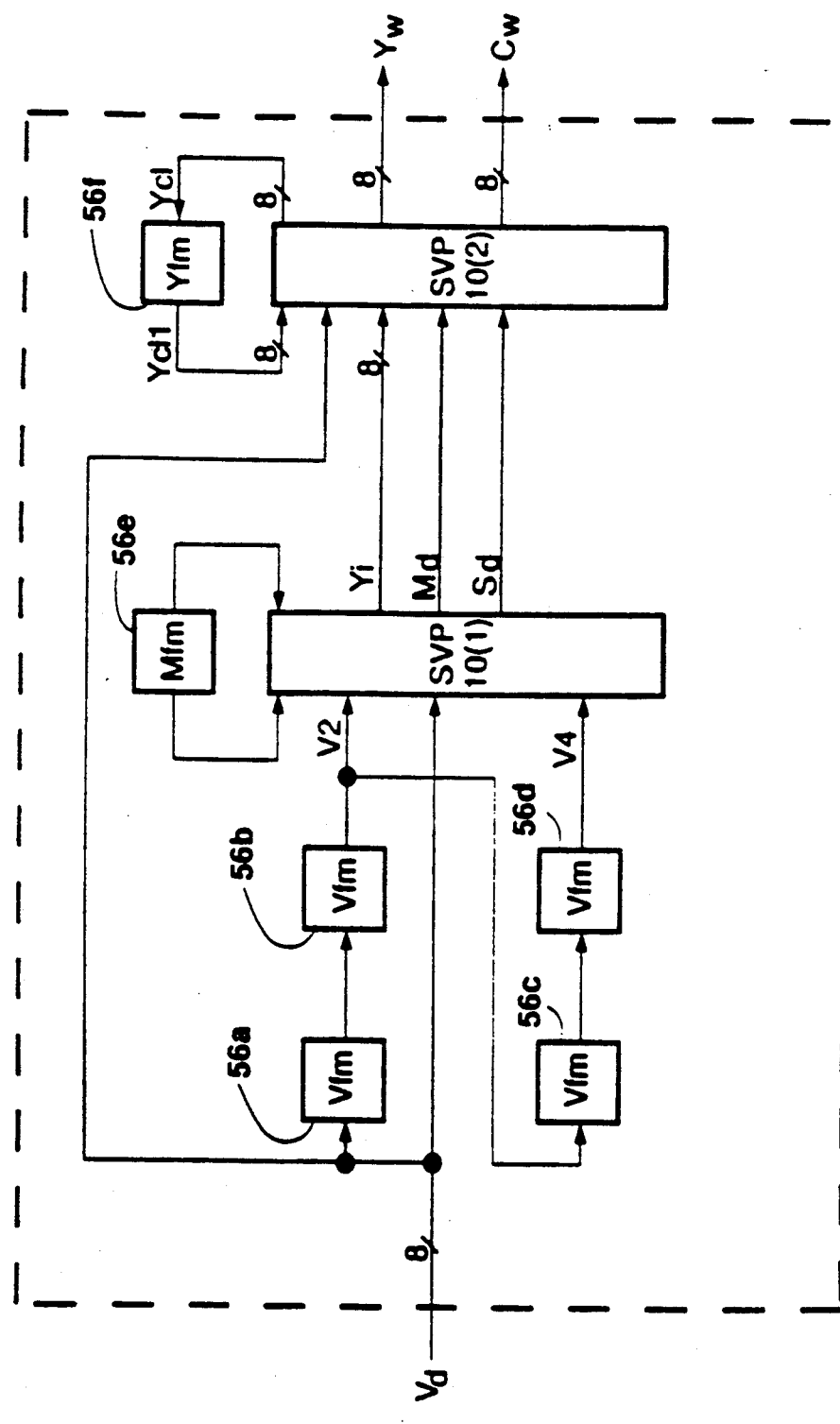
FIG. 24 is a block diagram of the digital unit of FIG. 5B, having two processors and used in the receiver of FIG. 23.

FIG. 24 is a block diagram of digital unit 50b as used in the composite receiver system of FIG. 22.

Field memories 56a-56d are the same type of field memory used in the previously described embodiments, but serve a different function. Because there is only one incoming signal, Vd, there is no need for separate luminance and chrominance field memories.

The configuration of field memories 56a-56d and the input lines to SVP 10(1) permit receipt of a non-delayed signal, Vd, a two-field delayed signal, V2, and a four-field delayed signal, V4.

SVP 10(1) detects the motion and shape of incoming video data, using Vd, V2, and V4. SVP 10(1) outputs pre-processed luminance data, Yi, motion data, Md, and shape data, Sd.

SVP 10(2) separates the luminance and chrominance from the composite video signal, using Vd, Vi, Md, and Sd. This process takes advantage of the manner in which luminance and color signals are mixed before transmission. In each successive frame, the phase relationship of the color signal with respect to the luminance signal reverses, which permits the chrominance signal to be extracted by subtracting one frame from another. Once the chrominance signal is obtained, the luminance signal is obtained by subtracting the chrominance signal from the original composite signal, Vd. This is often referred to as "temporal Y/C separation".

However, this temporal Y/C separation can create a problem when there is motion in the picture. If there is motion, the information on successive frames is no longer aligned and temporal separation creates crosstalk. Yet, due to the fixed ratio between color subcarrier frequency and line frequency, there are other methods for Y/C separation. For example, using the NTSC standard, $fsc = 455/2 * fh$, where fsc is the color subcarrier frequency and fh is the horizontal line frequency. The resulting 227.5:1 ratio causes the chrominance and luminance frequency spectrums to interleave and permits vertical comb filters to comb the chrominance from the luminance or vice verse. In the vertical direction, the chrominance phase also reverses every line, so that if adjacent vertical pixels are subtracted, the luminance cancels and the chrominance doubles. This method is often referred to as vertical Y/C separation. Although vertical Y/C separation is unaffected by motion, a problem with vertical Y/C separation is that it is affected by vertical detail.

A third method of Y/C separation is referred to as horizontal Y/C separation, which is unaffected by motion, but which does not produce adequate resolution in the presence of horizontal detail.

In sum, the best solution for Y/C separation is a combination of temporal, vertical, and horizontal separation. Temporal separation is used in areas where there is no motion. Using the motion signal, Md, SVP 10(2) changes from temporal to spatial filtering in areas where motion is detected. Vertical and horizontal separation are used in areas of the screen where motion is present, with a shape detection signal, Sd, used to change the ratio of horizontal and vertical filter output.

Another process performed by SVP 10(2) is chrominance demodulation. This process may be simplified by phase locking the digital sampling clock to the color burst signal at four times the color burst frequency.

SVP 10(2) outputs a cleaned luminance signal, Ycl, which is fed to field memory 56f to obtain Ycl1. For non-interlacing, SVP 10(2) interpolates the luminance and chrominance data, using Ycl, Ycl1, Yi, the separated chrominance signals, and Md. The output signals of SVP 10(2) are Yw and Cw.

Field memories 56a-56d are controlled in the same manner as luminance field memory 56a in the two-processor embodiment of FIG. 18. Also, motion field memory 56e, luminance field memory 56f, SVP 10(1), and SVP 10(2) are controlled in the same manner as the corresponding parts of the embodiment of FIG. 18, and the timing diagrams of FIGS. 19A-19C apply.

The output rate of SVP 10(2) is twice its input rate, i.e., 8 fsc rather than 4 fsc. The read/write clock frequencies of each field memory 56 and each SVP 10 of digital unit 50b is 4 fsc, except for the write frequency of luminance field memory 56f and the read frequency of SVP 10(2). These latter frequencies are 8 fsc.

Special Features

The following description, together with FIGS. 25-31 describe special features that enhance the above-described IDTV configurations and processes. These special features are accomplished primarily with the manipulation of data inputs and outputs of field memories 56 within digital unit 50b. This is accomplished with various multiplexers, which redirect data paths so that no additional field memories are required.

As will be explained below, these multiplexers redirect data according to a user-selected mode, which may be "normal" for full-screen real-time display, "still" for a frozen picture display, or "multi-screen" for a reduced size moving display. The normal mode may be in accordance with the various IDTV methods discussed above.

Figure 25:
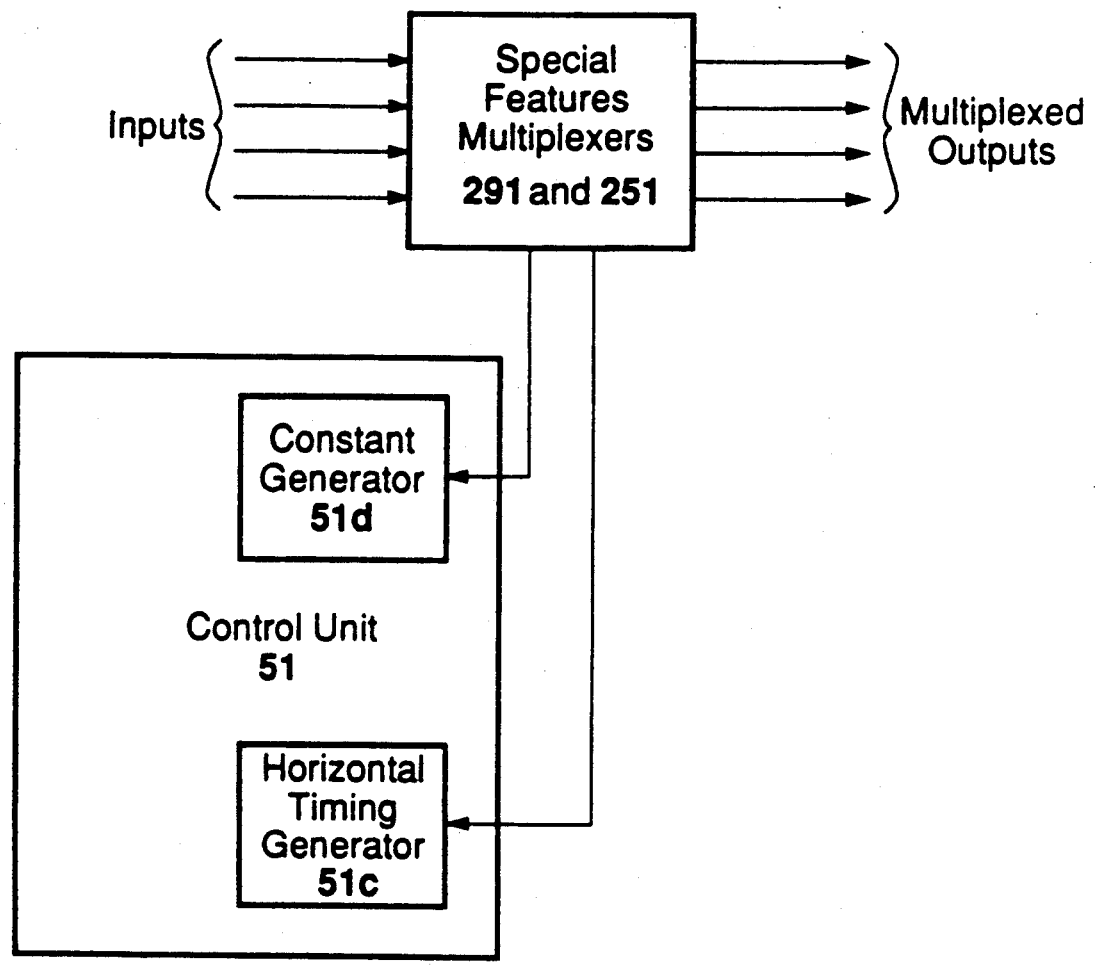
FIG. 25 is a block diagram of the interface between the processor system of FIG. 5A and a multiplexer unit for providing special features.

FIG. 25 is a block diagram illustrating the interface between multiplexers 251 and 291 and control unit 51 of FIG. 5A. Multiplexers 251 permit digital unit 50b to be operated in a still mode. Multiplexers 291, in addition to multiplexers 251, permit digital unit 50b to be operated in a multi-screen mode. These modes are explained below.

The mode selection inputs illustrated in FIG. 25 are via a user interface, such as main receiver control unit 58.

Still Mode

Figure 26:
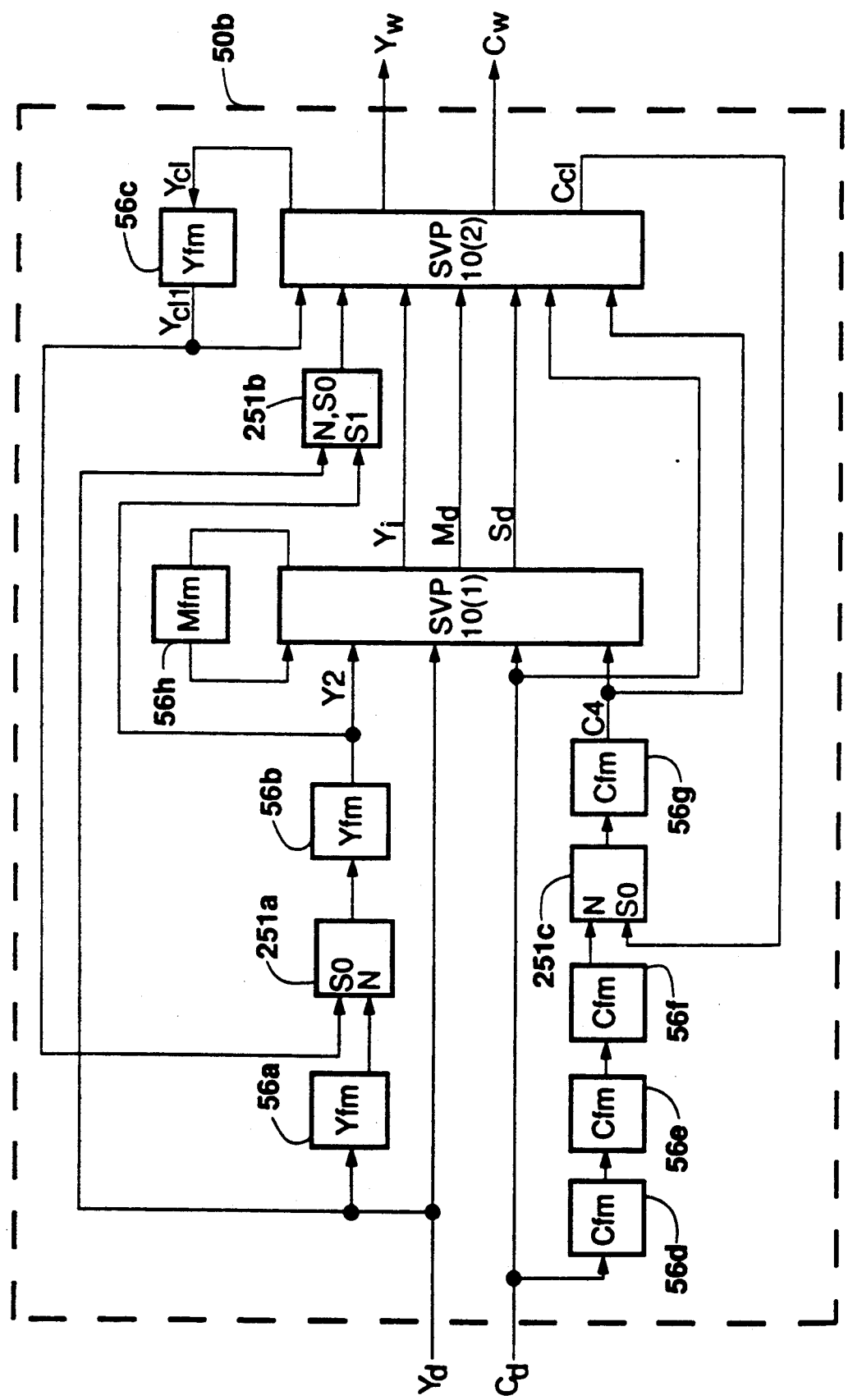
FIG. 26 is a block diagram of the processing system of FIG. 18, modified for providing a still mode.
Figure 27:
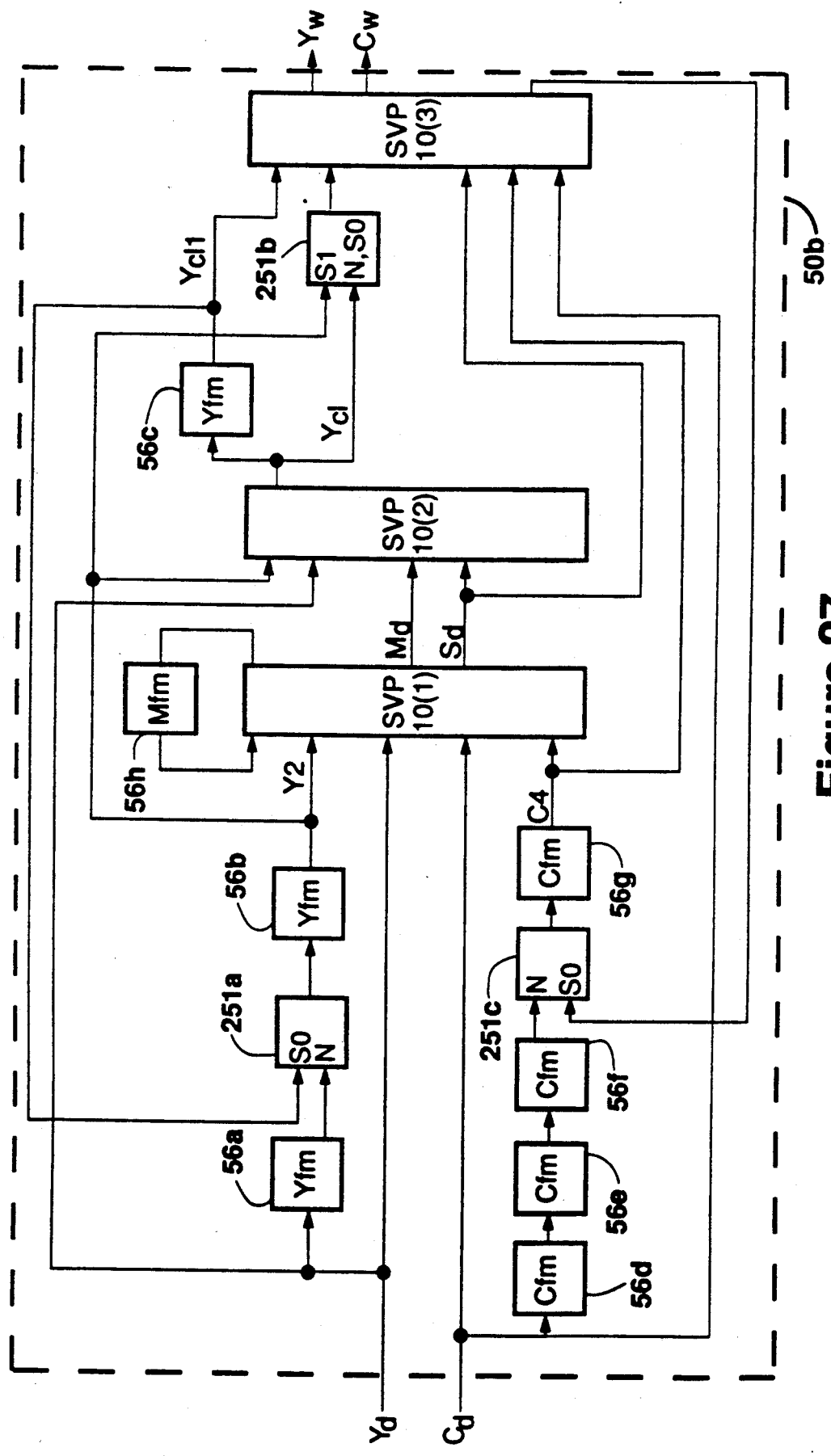
FIG. 27 is block diagram of the processing system of FIG. 20, modified for providing a still mode.
Figure 28:
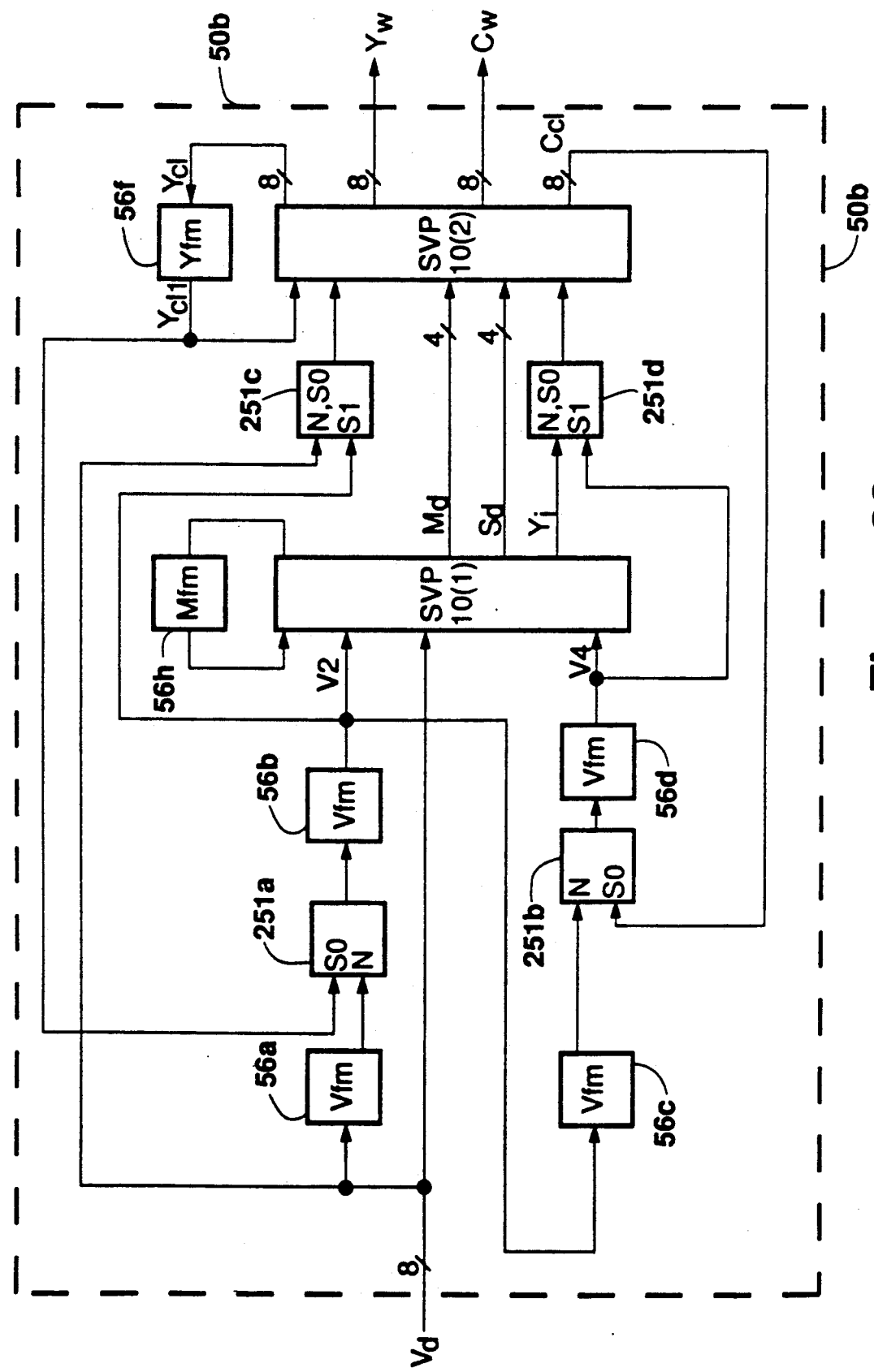
FIG. 28 is a block diagram of the processing system of FIG. 23, modified for providing a still mode.

FIGS. 26-28 are alternate configurations of the digital units 50b of FIGS. 18, 21, and 24, respectively. The variations are for providing a still picture mode in an improved definition television system. Each of these alternate configurations, like its counterpart, processes a standard composite television signal. The configuration of FIGS. 26 and 27 are used in component receivers, whereas the configuration of FIG. 28 is used in a composite receiver.

FIG. 26 is a block diagram of digital unit 50b, which has two processors and provides a still picture. This configuration of digital unit 50b is similar to digital unit 50b of FIG. 18, with the main difference being that two 2-to-1 8-bit multiplexers, 251a and 251b, and one 2-to-1 4-bit multiplexers 251c are added. Also, SVP 10(2) outputs a cleaned chrominance signal, Ccl.

In normal mode, all of the multiplexers 251a-251c select an "N" input to make a normal IDTV data path. This results in a television picture in accordance with the IDTV methods described above in connection with FIGS. 18-24, i.e., a full-screen real-time improved definition picture.

In still mode, two basic steps are required to produce a still picture. In general terms, the first step is a transient mode, in which cleaned data is stored rather than being subsequently processed for output. The second step results in a stable still mode, in which the processor receive processed data fed back to them via the field memories and multiplexers rather than new unprocessed data.

In accordance with the above general overview, and referring to FIG. 26, the first step is a one-field-period transient mode, for changing from normal mode to still mode. In this mode, all multiplexers 251a-251c select the S0 input. The output of field memory 56c, which is a one-field delayed cleaned luminance signal, is stored in field memory 56b. Cleaned chrominance data, Ccl, which is output from SVP 10(2), is stored in chrominance field memory 56g. Although this step departs from the normal processing mode with respect to luminance field memory 56c and chrominance field memory 56g, SVP 10(1) and SVP 10(2) continue normal mode processing, as do field memories 56a, 56d, 56e, and 56f. This permits a quick return to normal mode.

For obtaining the stable still mode, multiplexer 251b selects the S1 input. The normal mode write operation of field memories 56b, 56c, 56g, and 56h is stopped. The output of field memories 56b, 56c, and 56h is used to interpolate data from areas of the transmitted picture in which there is no motion. The output of field memory 56h, which is motion data, is used to alter the method of interpolation in the areas of the transmitted picture in which there was motion, using SVP 10(1). This manner of switching between spatial and temporal filtering is in accordance with the switching process described above in connection with FIGS. 11-13.

FIG. 27 is a block diagram of a three-processor digital unit 50b for providing a still picture in a component receiver. This configuration is similar to the digital unit 50b of FIG. 21. The main difference between FIG. 27 and FIG. 20 is that two 2-to-1 8-bit multiplexers, 251*a* and 251*b*, and one 2-to-1 4-bit multiplexer 251*c* are added and SVP 10(2) outputs a cleaned chrominance signal, Ccl. The method of operation is the same as with the two-processor digital unit 50*b* of FIG. 26.

FIG. 28 is a block diagram of a digital unit 50*b* for providing a still picture in a composite receiver. This configuration is similar to the digital unit 50*b* of FIG. 23. The main difference between FIG. 28 and FIG. 23 is that four 2-to-1 8-bit multiplexers 251*a*–251*d* are added. The method of operation is the same as with the two-processor configuration of FIG. 26. To provide a fast return from still to normal mode, field memory 56*a* continues to operate in normal mode so that it always contains current data.

Multi-Screen Mode

As in the still mode, the multi-screen mode involves the addition of multiplexers to redirect the data path. Also, because a multi-screen picture requires the processing of simultaneous asynchronous pictures, two control units 51 are used.

Figure 29:
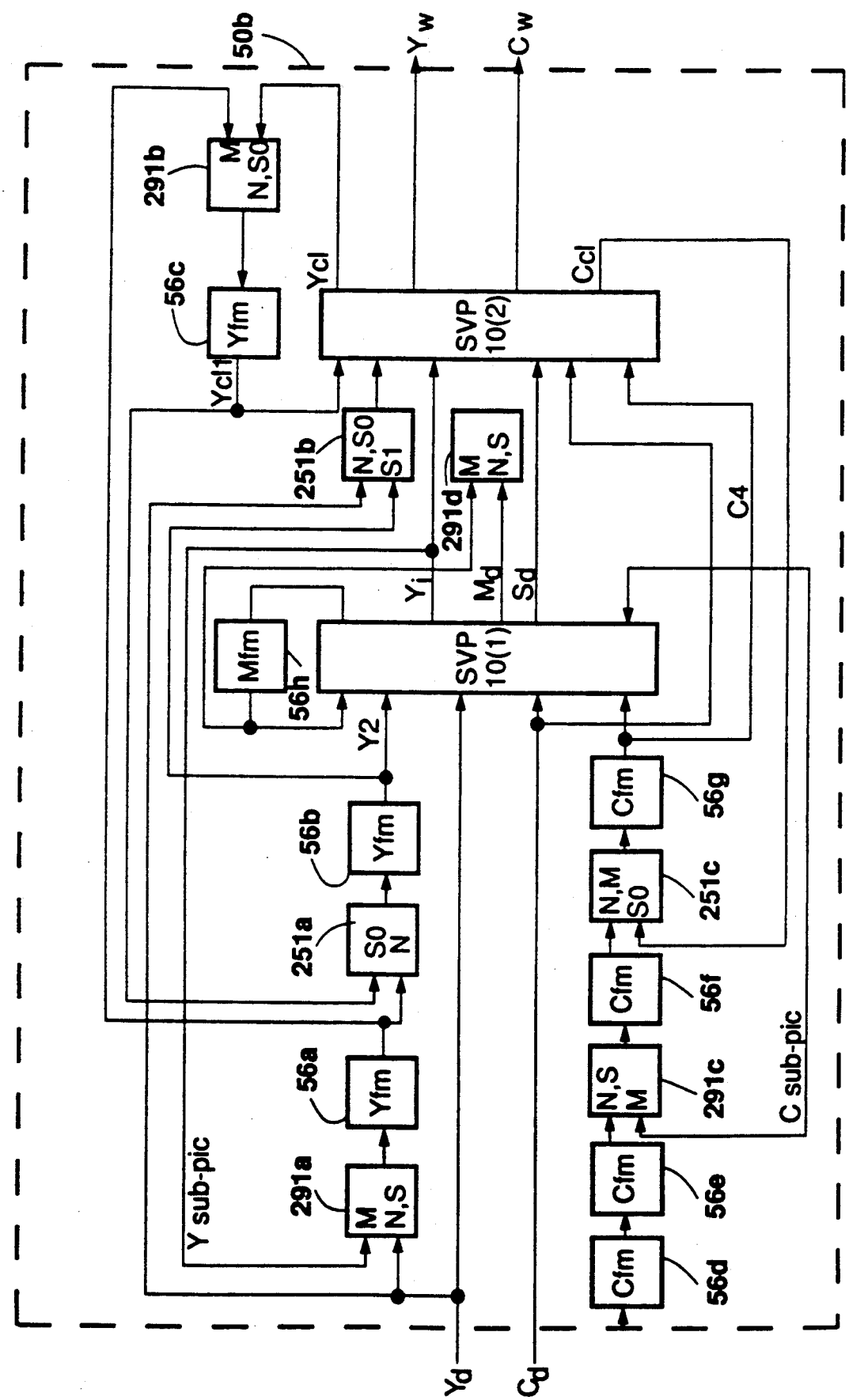
FIG. 29 is a block diagram of the processing system of FIG. 26, modified for providing a multi-screen mode.
Figure 30:
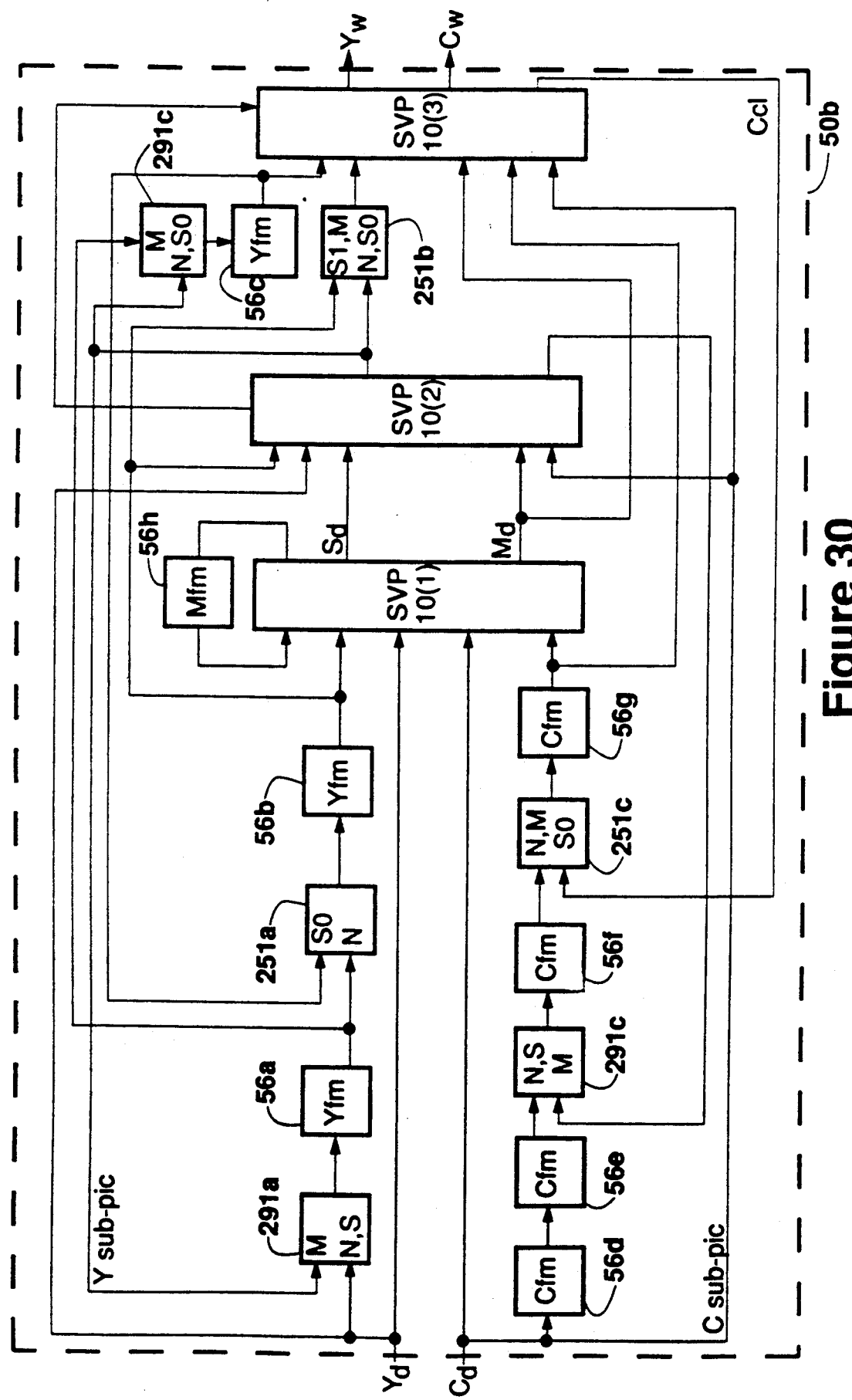
FIG. 30 is block diagram of the processing system of FIG. 27, modified for providing a multi-screen mode.
Figure 31:
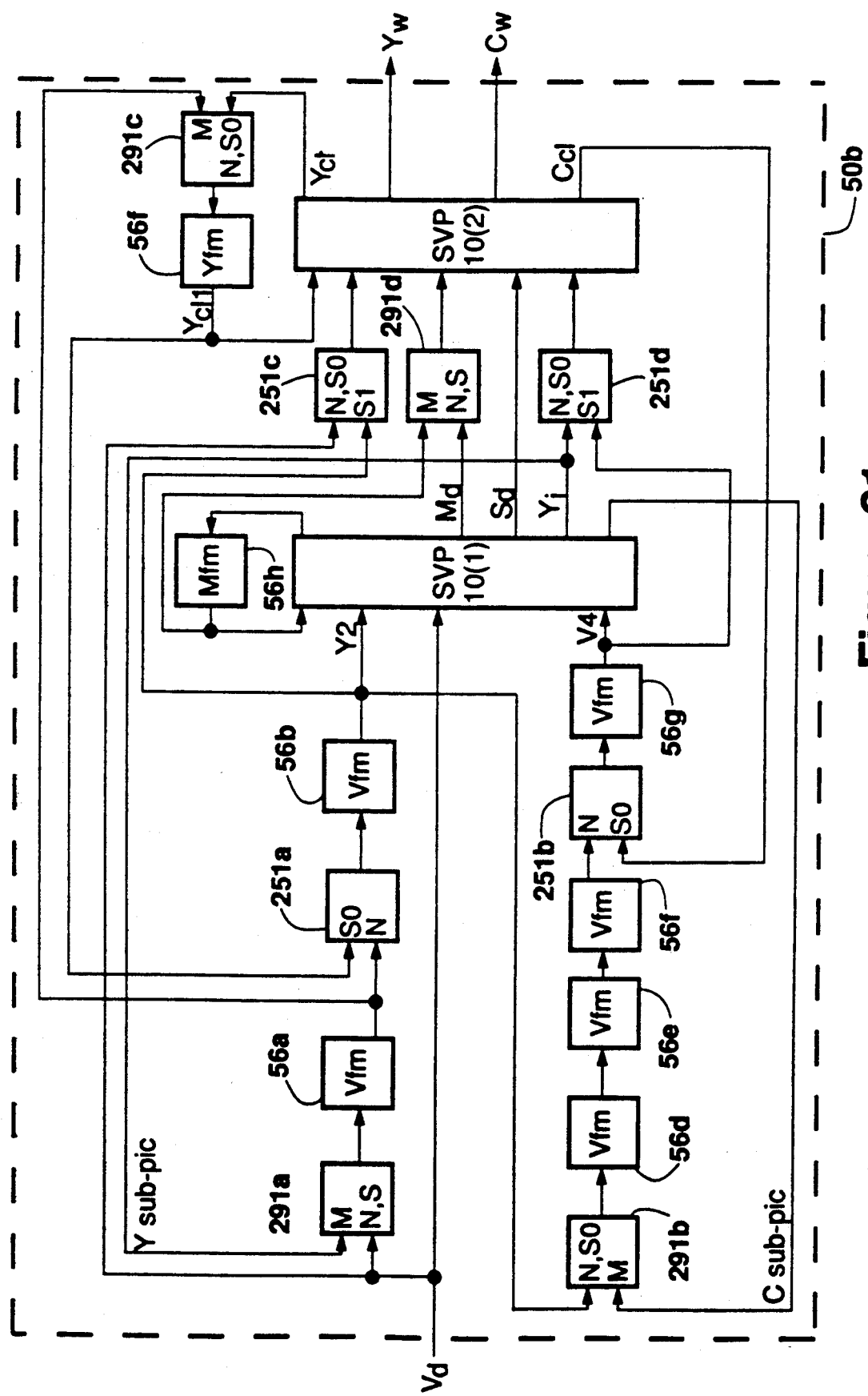
FIG. 31 is a block diagram of the processing system of FIG. 28, modified for providing a multi-screen mode.

FIGS. 29–31 are further variations of the digital units 50*b* of FIGS. 26–28. These variations are for providing a multi-screen mode in an improved definition television system. Each of these alternate configurations, like its counterpart, processes a standard composite television signal, where the configuration of FIGS. 29 and 30 are used in component receivers and the configuration of FIG. 31 is used in a composite receiver.

FIG. 29 is a block diagram of a two-processor digital unit 50*b* for providing multi-screen pictures. This configuration is similar to the configuration of FIG. 26, with the addition of four multi-screen mode multiplexers 291*a*–291*d*. Multiplexers 291*a* and 291*b* are 2-to-1 8-bit multiplexers, and multiplexers 291*c* and 291*d* are 2-to-1 4-bit multiplexers.

In normal mode, all of the multiplexers 251 and 291 select the "N" input. This results in a full-screen real-time improved definition television picture. To change to a still mode, multiplexers 251 are operated in the manner described above, by being switched first to the "S0" mode, and then to the "S1" mode. Multiplexers 291 are operated in the "S" mode.

During the "S1" mode, a multi-screen mode can be introduced by changing the selection of multiplexers 251 and 291 to "M". A frozen main picture will remain in place while a sub-picture covers all of the main picture area.

Data for the sub-picture is introduced with the Yd and Cd inputs. SVP 10(1) performs pre-processing prior to shrinking of the sub-picture to avoid aliasing in both the horizontal and vertical directions. For example, the pre-processing may be low pass filtering in the horizontal and vertical direction.

The sub-picture data, Yd and Cd, are shrunk using field memories 56*a* and 56*f*, respectively. To shrink the sub-picture down to 1/n size, these field memories 56*a* and 56*f* store the data by 1/n rate in the horizontal direction and once per n scanning line in the vertical direction. They read out the data into a sub-picture area using a normal rate for both the horizontal and vertical directions.

Luminance and chrominance data of the shrunk sub-picture are written into appropriate areas of field memories 56*c* and 56*g*, respectively, via multiplexers 291*b* and 251*c*, respectively. This process updates the previous sub-picture, if any. At the same time, SVP 10(1) fills the corresponding area of field memory 56*h* with data that indicates complete motion. The output of field memory 56*h* is delivered to SVP 10(2) via multiplexer 291*d*. Then, SVP 10(2) interpolates this area of luminance and chrominance data using only data from field memory 56*c* or 56*g*, which is shrunk sub-picture data. The resulting sub-picture is a motion picture, but without temporal processing.

In multi-screen mode, the following devices are synchronized with the displayed picture: SVP 10(2), the read operations of field memories 56*a*, 56*b*, 56*c*, 56*f*, 56*g*, and 56*h*, and the write operations of field memories 56*c*, 56*g*, and 56*h*. The following devices are synchronized with the sub-picture: SVP 10(1) and write operations of field memories 56*a*, 56*f*, and 56*h*. Field memories 56*d* and 56*e* continue to operate in normal mode, to fill them with current chrominance data and enhance a fast recovery from multi-screen to normal mode.

FIG. 30 is a block diagram of a three-processor digital unit for providing multi-screen pictures. This configuration is similar to the configuration of FIG. 27, with the addition of three multi-screen mode multiplexers 291*a*–291*c*. Multiplexers 291*a* and 291*b* are 2-to-1 8-bit multiplexers, and multiplexers 291*c* is a 2-to-1 4-bit multiplexer.

The operation of digital unit 50*b* of FIG. 30 is like that of digital unit 50*b* of FIG. 29, with a few differences. One difference is that pre-processing prior to shrinking of the sub-picture is performed by SVP 10(2). Also, interpolation is performed by SVP 10(3). SVP 10(3), as well as SVP 10(1) and SVP 10(2), is synchronized with the displayed picture.

FIG. 31 is a block diagram of a two-processor digital unit for providing multi-screen pictures in a composite receiver. This configuration is similar to the configuration of FIG. 28, with the addition of four multi-screen mode multiplexers 291*a*–291*d*. Multiplexers 291*a*–291*c* are 2-to-1 8-bit multiplexers, and multiplexer 291*d* is a 2-to-1 4-bit multiplexer.

The operation of digital unit 50*b* of FIG. 31 is similar to that of FIGS. 29 and 30, except that the data input to SVP 10(1) is Vd, a digitized composite signal, rather than a Y/C separated signal. SVP 10(1) separates the signal into luminance and chrominance and pre-processes this data. This processing is in accordance the two-processor digital unit 50*b* discussed above in connection with FIG. 23.

A luminance sub-picture and a chrominance sub-picture are shrunk by field memories 56*a* and 56*c* and written into appropriate areas of field memories 56*f* and 56*d*, respectively, via multiplexers 291*c* and 251*b*. This updates the previous sub-picture, if any. At the same time, SVP 10(1) fills the corresponding area of field memory 56*e* with data that indicates complete motion. The output of field memory 56*e* is delivered to SVP 10(2) via multiplexer 291*d*. Then, SVP 10(2) interpolates this area of luminance and chrominance data using only data from field memory 56*c* or 56*g*, which is shrunk sub-picture data. The resulting sub-picture is a motion picture, but without temporal processing.

In multi-screen mode, the following devices are synchronized with the displayed picture: SVP 10(2), the read operations of field memories 56*a*, 56*b*, 56*c*, 56*d*, 56*e*, and 56*f*, and the write operations of field memories 56*f*, 56*d*, and 56*e*. The following devices are synchronized with the sub-picture: SVP 10(1) and field memories 56*a*, 56*c*, and 56*e*.

In an alternative embodiment, the Md and Sd output of SVP 10(1) may be used for the sub-picture data. This has the advantage of fewer SVP 10(1) outputs.

Other Embodiments

Although the invention has been described with reference to specific embodiments, this description is not meant to be construed in a limiting sense. Various modifications of the disclosed embodiments, as well as alternative embodiments of the invention will be apparent to persons skilled in the art. It is, therefore, contemplated that the appended claims will cover all modifications that fall within the true scope of the invention.

Summary of Preferred Embodiments

A first group of embodiments are "normal" IDTV modes. One normal mode embodiment is a digital processing unit for use in a television receiver for providing an improved television signal from data samples of a standard television signal. The processor is a single-instruction multiple-data processor, having a number of processing elements corresponding to the number of said data samples. The processor receives a packet of said data samples representing a line of said television picture word-serially and operates on said line of data samples in parallel. A plurality of field memories provide field-delayed data samples to the processor. A control unit provides control and timing signals, and an instruction generator for provides instructions. A memory stores the instructions and is programmed with instructions for various IDTV tasks.

A normal mode system embodiment is a television receiving system for receiving a standard television transmission signal and producing an improved definition picture. An analog to digital unit converts the received signal to generate a signal having digital picture samples. The system also has a digital processing as described in the preceding paragraph, for performing various IDTV tasks. A digital to analog circuit converts the processed signal to analog picture signal, a display unit generates picture signals, and a display displays the said picture signals.

A normal mode method embodiment is a method of using a single-instruction multiple-data processor for processing a digitized standard television signal to provide an improved picture for display. One step is detecting areas of said picture in which there is motion. Another step is providing clean luminance and clean chrominance signals by removing cross signals from luminance and chrominance portions of the transmitted signal, using digital filtering techniques. This filtering is spatial in areas of the picture in which there is motion and temporal in areas of the picture in which there is no motion. These said steps are performed on digital samples of a horizontal line of said picture, simultaneously with respect to the samples, and all of said steps occur in less than one horizontal scan period with respect to each line.

Other method aspects of the invention includes various methods for specific IDTV processing tasks. These tasks include motion detection, luminance and chrominance clean-up, and non-interlacing.

A second group of embodiments are still mode embodiments. One still mode embodiment is a digital processing unit, which is like the normal mode digital processing unit, but also has a number of still mode multiplexers that redirect processed data back through the processor. A second still mode system embodiment is like the normal mode television receiver, but with the addition of these still mode multiplexers. A still mode method embodiment is a method of using a serial video processor to produce still pictures.

A third group of embodiments are multi-screen embodiments. One multi-screen mode embodiment is a digital processing unit, which is like the still mode digital processing units, but also has a number of multi-screen mode multiplexers that are used to generate a reduced size picture. Also, the digital processing unit has separate control units for synchronizing the multiple pictures. A second multi-screen mode embodiment is a system embodiment like the still mode television receiver, but with the addition of these multi-screen mode multiplexers. A multi-screen mode method embodiment is a method of using a serial video processor to produce multiple pictures.

What is claimed is:

1. A digital processing unit for use in a television receiver for providing an improved television signal from data samples of a standard television signal, representing a television picture comprising:
   a single-instruction multiple-data processor for processing said data samples, wherein said processor has a number of processing elements corresponding to the number of said data samples, and wherein said processor receives a packet of said data samples representing a line of said television picture word-serially, and wherein said processor operates on said line of data samples in parallel;
   a plurality of field memories for providing data samples representing delayed fields of said television picture to said processor;
   a control unit for providing control and timing signals to said processor;
   an instruction generator for providing instructions to said processor; and
   memory for storing instructions used by said processor, wherein said memory is programmed with instructions for spatial and temporal digital filtering for improving the quality of said television picture.

2. The digital processing unit of claim 1, wherein said memory is further programmed with a motion detection process.

3. The digital processing unit of claim 1, wherein said memory is further programmed with a non-interlacing process and wherein said timing signals are faster for output of said processor than for input, in response to said non-interlacing process.

4. The digital processing unit of claim 1, wherein said memory is further programmed to remove crosstalk signals from said television signal.

5. The digital processing unit of claim 1, wherein said memory is further programmed to separate luminance and chrominance signals.

6. The digital processing unit of claim 1, and further comprising a host interface for downloading instructions from a host development computer.

7. The digital processing unit of claim 1, wherein said control unit has a programmable horizontal timing generator and a programmable vertical timing generator.

8. The digital processing unit of claim 1, wherein said processor has memory for emulating external line memory devices.

9. A television receiving system for receiving a standard television transmission signal representing a television picture and producing an improved definition picture comprising:

an analog to digital unit for converting said received signal to generate a signal having digital picture samples;

a digital processing unit having at least one single-instruction multiple-data processor for processing said data samples, wherein said processor has a number of processing elements corresponding to the number of said data samples, and wherein said processor receives a packet of said data samples representing a line of said television picture word-serially, and wherein said processor operates on said line of data samples in parallel, and wherein said processor outputs a processed signal, and having a plurality of field memories for providing data samples representing delayed fields of said television picture to said processor, and having a control unit for providing control and timing signals to said processor, an instruction generator for providing instructions to said processor, wherein said memory is programmed for spatial and temporal digital filtering for improving the quality of said television picture;

a digital to analog circuit for receiving and converting said processed signal to analog picture signal;

a display unit for receiving said analog signal and generating picture signals; and a display for receiving said picture signals and displaying said picture signals.

10. The television receiving system of claim 9, wherein said receiving system further comprises a separator unit for separating said received signal into luminance and chrominance signals and a demodulator for separating said chrominance signal into color difference signals prior to receipt of said signals by said analog to digital unit.

11. The television receiving system of claim 9, wherein said memory is programmed for separating said digital picture samples from said analog to digital unit into a digital luminance signal and a digital chrominance signal.

12. The television receiving system of claim 9, wherein said processor is programmed with a motion detection process, stored in said memory.

13. The television receiving system of claim 9, wherein said processor is programmed with a non-interlacing process, stored in said memory, and wherein said timing signals are faster for output of said processor than for input, in response to said non-interlacing process.

14. The television receiving system of claim 9, wherein said processor is programmed with a process for removing crosstalk signals from said television signal, said process being stored in said memory.

15. A method of using a single-instruction multiple-data processor for processing a digitized standard television signal representing a television picture to provide an improved picture for display, comprising the steps of:

detecting areas of said picture in which there is motion;

providing clean luminance and clean chrominance signals by removing cross signals from luminance and chrominance portions of said digitized standard television signal, using digital filtering techniques, wherein said filtering is spatial in areas of said picture in which there is motion and temporal in areas of said picture in which there is no motion;

wherein said steps are performed on digital samples of a horizontal line of said picture, simultaneously with respect to said samples, and wherein all of said steps occur in less than one horizontal scan period with respect to each line.

16. The method of claim 15, wherein said motion detection step comprises using said processor for line comb filtering of said data.

17. The method of claim 15, and further comprising the step of providing a non-interlaced picture by combining field-delayed data with current field data in areas of said picture wherein no motion is detected, and by combining the values of vertically adjacent pixels in areas of said picture wherein motion is detected, to provide a non-interlaced signal, and wherein said non-interlaced picture has a greater data rate than said picture.

18. The method of claim 17, and further comprising the step of contour compensation, using said non-interlaced signal.

19. The method of claim 15, and further comprising the step of separating luminance from chrominance portions of a composite signal.

20. A method of using a single-instruction multiple-data processor for detecting motion in areas of a digitized standard television signal to provide an improved picture for display, comprising the steps of:

using register files of said processor to emulate line memories for data representing horizontal lines of said picture; and processing said data by first obtaining data delayed by one frame and subtracting said delayed data from current frame data, filtering said data to obtain a motion magnitude signal, comparing said data with feedback data to prevent loop gain, and filtering said data to reduce noise.

21. A method of using a single-instruction multiple-data processor for removing cross signals from a digitized standard television signal to provide an improved picture for display, comprising the steps of:

in areas of said picture having no motion, subtracting a two-field delayed signal from a current signal to obtain a crosstalk signal in areas of said picture having motion, spatially filtering said current signal;

switching between the output of said subtraction step and the output of said spatially filtering step, using a motion detection signal;

bandpass filtering the output of said switching step, using a horizontal bandpass filtering process to obtain a crosstalk signal; and subtracting the output of said bandpass filtering step from said current signal to obtain a signal containing no crosstalk.

22. A method of using a single-instruction multiple-data processor for non-interlacing a digitized standard television signal, having a certain scan rate, to provide an improved picture for display, comprising the steps of:

in areas of said picture having no motion, bringing forward field-delayed data to generate an additional line;

in areas of said picture having motion, averaging adjacent lines to generate an additional line;

switching between said bringing forward step and said averaging step, using a motion detection signal, to generate an interpolated line;

scanning said interpolated line and said adjacent lines at a faster rate than said scan rate of said television signal; and repeating said steps for successive lines of said television signal.

23. A method for providing an improved television signal, comprising the steps of:

receiving a digital signal comprised of data samples representing a television picture, wherein each horizontal line of said television picture is represented by a select number of data samples;

comparing successive frames of said television picture to detect areas of motion in said picture;

cleaning-up said digital signal by removing signal crosstalk, using spatial filtering in said areas of motion and temporal filtering in areas of no motion, and performing said cleaning-up by a processor which loads said digital signal word-serially and processes said digital signal in parallel and wherein said processor has a number of processing elements corresponding to said select number of data samples, and wherein said processor outputs a cleaned-up digital signal word-serially;

converting said cleaned-up digital signal to an analog signal;

converting said analog signal to an improved picture signal; and displaying an improved television picture represented by said improved picture signal.

24. The method of claim 23, comprising the further step of:

converting an analog television signal to a digital signal prior to said receiving a digital signal step.

25. The method of claim 23, comprising the further step of:

storing digital samples representing previous frames of said television picture in field memories.

26. The method of claim 23, comprising the further step of:

merging digital samples representing interlacing fields to provide a non-interlaced signal.

27. A system for providing an improved television picture, comprising:

a receiver for receiving a television signal, representing a television picture;

an analog to digital converter for converting said television signal to data samples;

a processor for modifying said data samples, wherein said processor has a number of processing elements corresponding to the number of data samples representing one horizontal line of said television picture, and wherein said processor inputs said data samples word-serially and processes said data samples in parallel, and wherein said processor detects areas of said television picture wherein there is motion and areas of said television picture wherein there is no motion, and wherein said processor processes said data samples representing said areas wherein there is motion by spatial filtering and processes said data samples representing said areas wherein there is no motion by temporal filtering, and wherein said processor outputs said processed data samples word-serially;

a digital to analog converter for converting said processed data samples to an analog signal; and a display unit for displaying a modified television picture represented by said analog signal.

28. The system of claim 17, further comprising:

field memories for storing data samples representing previous frames of said television picture.

29. The system of claims 27, further comprising:

memory for storing instructions for said processor.

* * * * *